United States Patent
Alpern et al.

(10) Patent No.: US 8,521,706 B2
(45) Date of Patent: Aug. 27, 2013

(54) LOW-DOWNTIME AND ZERO-DOWNTIME UPGRADES OF DATABASE-CENTRIC APPLICATIONS

(75) Inventors: David M. Alpern, San Jose, CA (US); Alan Choi, Redwood City, CA (US); Chandrasekharan Iyer, Foster City, CA (US); Jaebock Lee, Sunnyvale, CA (US); Kumar Rajamani, San Ramon, CA (US); Shrikanth Shankar, Los Altos, CA (US); Guhan Viswanathan, Kirkland, WA (US); William Waddington, Foster City, CA (US); Philip Yam, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 764 days.

(21) Appl. No.: 11/875,478

(22) Filed: Oct. 19, 2007

(65) Prior Publication Data
US 2008/0098046 A1    Apr. 24, 2008

Related U.S. Application Data

(60) Provisional application No. 60/853,099, filed on Oct. 20, 2006.

(51) Int. Cl.
*G06F 7/00* (2006.01)
*G06F 17/00* (2006.01)
*G06F 17/30* (2006.01)

(52) U.S. Cl.
USPC .......................................... 707/695; 707/736

(58) Field of Classification Search
USPC ........................................ 707/200, 695, 736
See application file for complete search history.

(56) References Cited

U.S. PATENT DOCUMENTS

| | | | |
|---|---|---|---|
| 5,227,967 A | 7/1993 | Bailey | |
| 5,315,709 A | 5/1994 | Alston et al. | |
| 5,440,743 A | 8/1995 | Yokota et al. | |
| 5,448,727 A | 9/1995 | Annevelink | |

(Continued)

OTHER PUBLICATIONS

Davidson, Tom. "Managing Schema Changes (Part 2)."MSSQL Server Development Customer Advisory Team. Mar. 31, 2006. Microsoft Corporation. Nov. 19, 2000 <http://blogs.msdn.com/sqlcat/archive/2006/O3/31/566046.aspx>.*

(Continued)

*Primary Examiner* — Etienne Leroux
*Assistant Examiner* — Jared Bibbee
(74) *Attorney, Agent, or Firm* — Hickman Palermo Truong Becker Bingham Wong LLP

(57) ABSTRACT

A database may facilitate zero-downtime upgrades by concurrently maintaining multiple editions of database objects for use by both pre-upgrade and post-upgrade clients of a database application. Operations performed within the database are associated with an edition based on, for example, an initiating client or transaction. When an operation references an object or data, the database automatically performs the operation using the object or data associated with the edition with which the operation is itself associated. The database may determine the associated edition without explicit identification of the associated edition in a query or in code. Thus, no client or stored procedure code changes are necessary to reflect a new edition added during an update. Data changes in one edition may be automatically and immediately propagated to the other edition through the use of cross-edition triggers, thereby allowing both pre-upgrade and post-upgrade clients to remain fully functional throughout an upgrade.

22 Claims, 8 Drawing Sheets

(56) References Cited

U.S. PATENT DOCUMENTS

| | | | |
|---|---|---|---|
| 5,555,388 | A | 9/1996 | Shaughnessy |
| 5,608,903 | A | 3/1997 | Prasad et al. |
| 5,640,550 | A | 6/1997 | Coker |
| 5,717,924 | A | 2/1998 | Kawai |
| 5,978,426 | A | 11/1999 | Glover et al. |
| 6,016,497 | A | 1/2000 | Suver |
| 6,122,630 | A | 9/2000 | Strickler et al. |
| 6,122,640 | A | 9/2000 | Pereira |
| 6,173,313 | B1 | 1/2001 | Klots et al. |
| 6,268,850 | B1 | 7/2001 | Ng |
| 6,304,867 | B1 | 10/2001 | Schmidt |
| 6,324,535 | B1* | 11/2001 | Bair et al. .......... 707/4 |
| 6,363,387 | B1 | 3/2002 | Ponnekanti et al. |
| 6,460,055 | B1 | 10/2002 | Midgley et al. |
| 6,480,848 | B1 | 11/2002 | DeKimpe et al. |
| 6,519,613 | B1 | 2/2003 | Friske et al. |
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1* | 7/2004 | Schoening et al. .......... 719/316 |
| 6,801,983 | B2 | 10/2004 | Abe et al. |
| 6,834,290 | B1 | 12/2004 | Pugh et al. |
| 6,965,899 | B1 | 11/2005 | Subramaniam et al. |
| 7,574,461 | B1* | 8/2009 | Armorer et al. .......... 1/1 |
| 7,693,889 | B1* | 4/2010 | Armorer et al. .......... 707/653 |
| 2002/0019972 | A1* | 2/2002 | Grier et al. .......... 717/3 |
| 2002/0087271 | A1 | 7/2002 | Rozenshtein et al. |
| 2002/0188600 | A1 | 12/2002 | Lindsay et al. |
| 2003/0154216 | A1* | 8/2003 | Arnold et al. .......... 707/104.1 |
| 2003/0217069 | A1 | 11/2003 | Fagin et al. |
| 2003/0229610 | A1 | 12/2003 | Van Treeck |
| 2004/0064487 | A1 | 4/2004 | Nguyen et al. |
| 2005/0149475 | A1 | 7/2005 | Chkodrov et al. |
| 2005/0154695 | A1* | 7/2005 | Gonzalez et al. .......... 707/1 |
| 2006/0015528 | A1 | 1/2006 | Hejlsberg et al. |
| 2006/0085457 | A1 | 4/2006 | Gelfand |
| 2007/0038590 | A1* | 2/2007 | Vijayan et al. .......... 707/1 |
| 2007/0038651 | A1 | 2/2007 | Bernstein et al. |
| 2007/0079140 | A1 | 4/2007 | Metzger et al. |
| 2007/0219951 | A1 | 9/2007 | Ahmed et al. |

OTHER PUBLICATIONS

Ambler, Scott, and Pramod Sadalage. Refactoring Databases: Evolutionary Database Design. Mar. 3, 2006.*

Lassen et al. Experiences with object oriented development in PL/SQL, Center for Object Technology COT/4-18-V1.4, 2000.

Object Cache Navigation, Oracle Call Interface PRogrammer's Guide, Release 2 (9.2), Part No. A96584-10, 1996, 2002.

Date et al, A Guide to SQL/DS, 1989, Addison-Wesley, Chapter 10.

Quest Software, Inc., LiveReorg.RTM., "Reorganization for the 24.times.7 Database," 2001.

Paapanen, Eric, et al., "Oracle Database Application Developer's Guide—Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

* cited by examiner

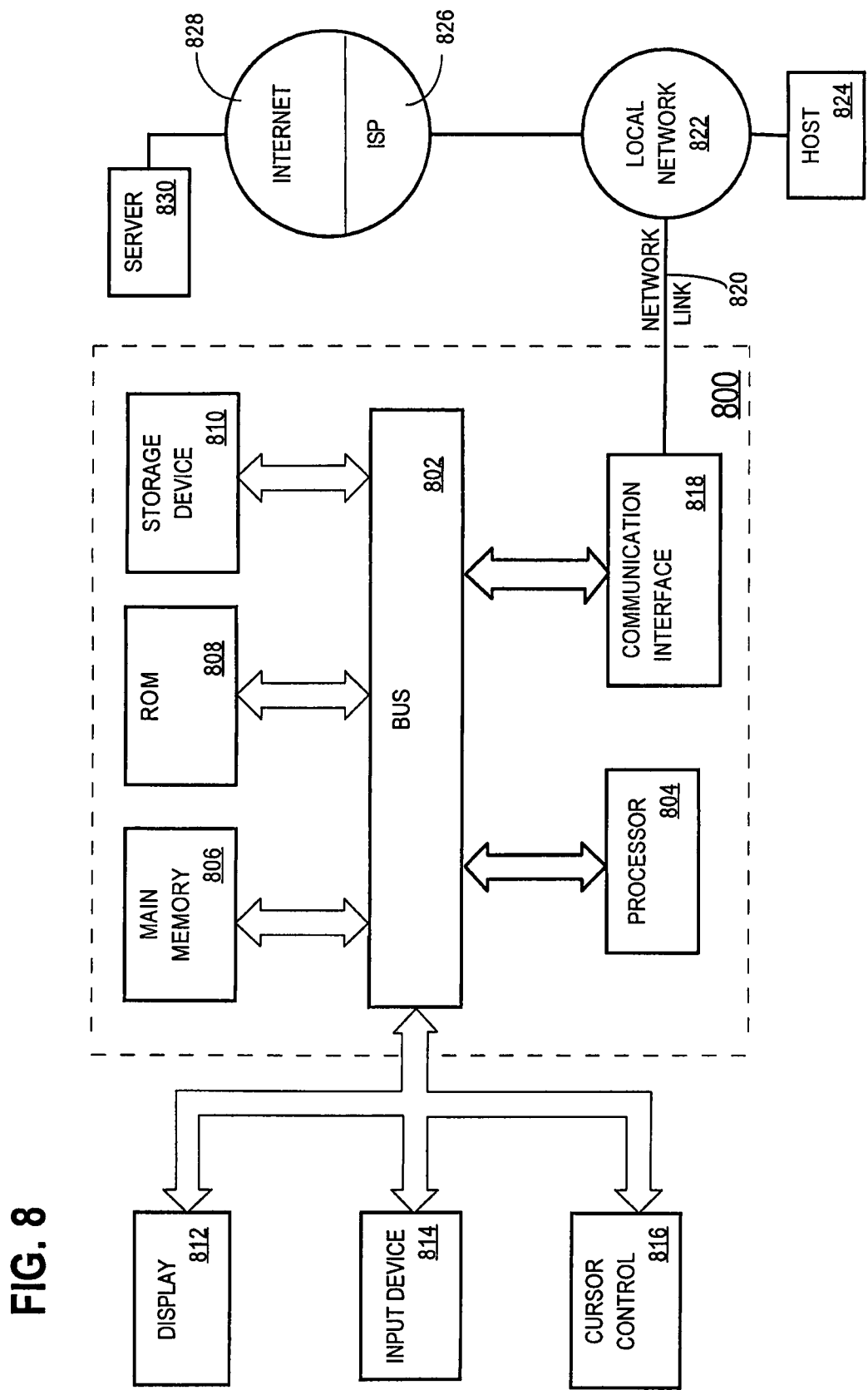

LOW-DOWNTIME AND ZERO-DOWNTIME UPGRADES OF DATABASE-CENTRIC APPLICATIONS

PRIORITY CLAIM

This application claims the benefit under 35 U.S.C. 119(e) of provisional Application No. 60/853,099, "Edition, Patching and Transforms," by Alpem et al., filed Oct. 20, 2006, the entire contents of which are hereby incorporated by reference for all purposes as if fully set forth herein.

CROSS-REFERENCE TO RELATED APPLICATIONS

This application is related to U.S. patent application Ser. No. 11/129,717, Pub. No. 2006-0004886 A1, filed May 13, 2005, entitled "System for managing versions of cached metadata," by Green et al.; U.S. patent application Ser. No. 11/201,797 Pub. No. 2007-0038590 A1, filed Aug. 10, 2005, entitled "Minimizing computer resource usage when converting data types of a table column," by Vijayan et al.; and U.S. patent application Ser. No. 11/444,571, filed May 31, 2006, entitled "In place migration when changing datatype of column," by Arora et al., the entire contents of which are hereby incorporated by reference for all purposes as if fully set forth herein.

FIELD OF THE INVENTION

Embodiments of the invention described herein relate generally to database maintenance, and, more specifically, to techniques for zero-downtime or low-downtime upgrades of database-centric applications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In database applications, client-based applications typically interact with a database system to access and manipulate objects inside of one or more databases. Client-based applications may include application server-based code, such as code that runs within machines that process requests sent from web browsers and other "thin" client applications, as well as standalone code on machines running "thick" client applications, including code running on the same machine as the database system. Collectively, client-based applications may be referred to as "clients."

Databases within a database system store a variety of objects. A database may define an object through metadata in a database. A database may store an object's actual contents (e.g. data, compiled code, and so on) as a representation residing in-memory, on a storage device, or in any other database-accessible location.

Particularly common in a database are data objects, which define, store, and reference the data in the database. Among the many types of data objects are tables, views, synonyms, and materialized views. A table, for example, may store data values in rows and columns. Database systems use another type of object, called a view, to provide "virtual" tables. In addition to data, objects may also comprise units of code, such as stored procedure code or program units, that run within the database system.

Instead of containing data values, a view may define rows and columns that are mapped to rows and columns of one or more "base tables" in a database, thereby offering applications an alternative or filtered "view" of the data in the database. Views may be referenced in database languages statements that conform to database language (e.g. SQL), and be treated by a database system as references to tables. Typically, a view is defined by a data definition language statement issued to the database system that specifies a query to define the view.

Both objects and data may be accessed, manipulated, and utilized either directly or indirectly in operations performed by the database system. A client may request that the database system perform an operation through a query. A query may, for example, be represented in a database language, including SQL (both ANSI and proprietary standards) or PL/SQL, a procedural database language promulgated by Oracle Corporation. Database operations may also be performed in response to a variety of other events, such as maintenance operations, internally issued queries, and internally executed stored procedure code.

Database applications often require upgrades to expand functionality, fix bugs, or increase security. An upgrade may be performed by software following steps coded by an application upgrade provider. Various upgrade steps may also be performed by other pieces of software or by a system administrator. Steps performed during an upgrade by the above-mentioned entities or units may, for brevity, be said to be performed by an "upgrade" or "upgrade process."

Upgrades typically require changes to objects and data within the databases of a database system. An upgrade to a database application may change, for example, metadata about available database tables, such as which columns exist, what type of data each column contains, what constraints are enforced, and so on. Additionally, the actual contents of the existing data in the tables may need to be "transformed" to correct errors in the data or change the data to a different format or type. For instance, an upgrade may transform the data type of a column from string to date or from integer to decimal. As another example, an upgrade may need to transform values in one column from degrees Fahrenheit to degrees Celsius. As another example, an upgrade could transform a "full name" column into two columns: one for a first name and one for a last name.

Upgrades may also require changes to other database objects, such as stored procedure code, as well as to clients. Data changes may necessitate changes to both stored procedure code and the code behind client-based applications. Code must be updated or recompiled to accommodate changes in nomenclature, data types, or storage schemes for the data and objects that the code references. For instance, stored procedure code that has been compiled under the assumption that a certain table has two columns may have to be recompiled if that table now has three columns. An upgrade may also change both client-based and stored procedure code to fix bugs or provide new functionality.

The changes made to the various components of a database application during the upgrade process are dependent upon each other for proper behavior of the database application. The application will not run with correct results if a component interacts with components whose versions of code and data are incompatible with the component. For example, if a database has been upgraded so that a column is now named C1, but a client has not been updated and thinks the column is named C0, the client will not be able to access the data from that column.

To avoid the undesirable side effects of application components interacting with incompatible components, application upgrades may require turning off real-world use of the application while upgrading all of the components of that application. The resulting application "downtime" (i.e. the period of time during which the application cannot be used) often lasts multiple days. Downtime for any noticeable period is very undesirable, especially as users increasingly expect access to database applications twenty-four hours a day, seven days a week. Consequently, system administrators are often hesitant to upgrade applications, even when an upgrade provides better security or highly desirable features.

To avoid downtime, many application vendors limit themselves as much as possible to upgrades in which data values do not need to be modified or rearranged in a manner that is incompatible with the data expected by the pre-upgrade application. To the extent it is possible to avoid incompatibilities between upgraded and non-upgraded components, this strategy allows continued use of the pre-upgrade version of the application as use of the post-upgrade application is "phased-in." Unfortunately, there are many bug fixes and feature additions that cannot be implemented without breaking compatibility with the pre-upgrade version of the application. Furthermore, it is often more costly and time-consuming to develop upgrades that maintain compatibility with prior application versions.

Another approach to reducing downtime for application upgrades is to combine database replication technology with software that captures data changes by pre-upgrade components of an application and replays them into a database copy used exclusively by the post-upgrade version of the application. In such an approach, a system administrator will create a new copy of a database, with which an upgraded client can interact. Specially designed synchronization software captures data changes made by pre-upgrade application components and reformats or modifies the changed data to be appropriate for the post-upgrade application. The changes are then copied to the new database.

Database replication approaches suffer from several problems. First, the clients must be reconfigured to use the new database, even though many clients might not otherwise require changes during the upgrade. Second, this approach requires the duplication of many resources, such as objects and data that do not actually change during the upgrade. For example, an upgrade may only affect a table T0 in a database, but nonetheless require duplication of all objects in the database. This approach may thus consume more memory resources than desirable. Finally, in cases where both versions of the application are allowed to run simultaneously in order to provide continuous service, such an approach suffers from merge and ordering difficulties. In other words, the same data being processed by one version of the application may have already been processed and changed within the database used by the other version of the application. For example, the same widget may have been allocated from a warehouse to satisfy a different purchase order from a different customer using a different version of the application. This behavior results because the separate copies of data used by the two versions of the application are not kept tightly enough synchronized for the two versions of the application to see each other's changes in a sufficiently timely manner.

One variation of this approach is to duplicate a schema instead of an entire database. This variation is useful when the data used by a database application resides solely within one schema. While replication of the schema avoids the memory costs associated with replication of the entire database, many resources that do not need to be replicated are nonetheless replicated. Furthermore coding the upgraded clients to work with a new schema often involves tedious reconstruction of account permissions, as well as reconfiguration of clients to work with the new schema. Finally, schema replication does nothing to solve merge and ordering problems.

A less wasteful variation of this approach in terms of memory costs is to replicate only those tables affected by the upgrade. However, this approach requires renaming the upgraded tables, since the upgraded tables could not share the same name as the pre-upgraded tables. Renaming tables, in turn, requires extensive updating of code. It may again require reconstruction of user permissions. Finally, renaming tables does not solve merge and ordering problems.

Other variations of the database replication approach have been made based on capturing application transactions at a higher level of abstraction, rather than on capturing changes to individual data items, and replaying the transactions in the post-upgrade version of the application. This can sometimes avoid the need for special software to reformat and modify the individual data items to make them appropriate for the post-upgrade application, but often requires special modifications to the application so that only particular aspects of the application's functionality occur when replaying the transactions, as other aspects (for example, billing the customer for the order) were already performed by the pre-upgrade version of the application. Such attempts still also suffer from the merge and ordering difficulties.

It is therefore desirable to provide upgrading techniques that require little downtime by allowing multiple versions of the same database application to run concurrently during the upgrade process. It is also desirable to provide upgrading techniques that do not require the unnecessary duplication, modification, or reconfiguration of application components, such as clients, objects, and data. Finally, it is also desirable to provide more reliable mechanisms for maintaining data integrity between two concurrently running versions of a database application.

BRIEF SUMMARY OF THE INVENTION

Described herein are approaches for upgrading that concurrently maintain multiple editions of objects and data in just one single database for use by both pre-upgrade and post-upgrade components of a database application. According to an embodiment, a database within a database system may comprise multiple "editions" of objects and data, each edition associated with a different version of the database application. Operations performed within the database system are associated with an edition based on, for example, the initiating client or transaction. When an operation references an object or data, the database system automatically performs the operation using the object or data associated with the edition with which the operation is itself associated. The database system may determine the associated edition without explicit identification of the associated edition in a query or in code. Thus, whereas the database replication approach requires tedious reconfigurations and code changes incident to, for instance, new users, schemas, and settings in the replicated database, no client or stored procedure code changes are necessary to reflect a new edition of a database—the database and schema names remain the same for the new edition. Furthermore, according to an embodiment, data may be kept consistent between editions through the use of crossedition triggers that transform data in one edition in response to corresponding data being changed in another edition.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is block diagram of a computer system upon which embodiments of the invention may be implemented.

DETAILED DESCRIPTION

Figure 1:
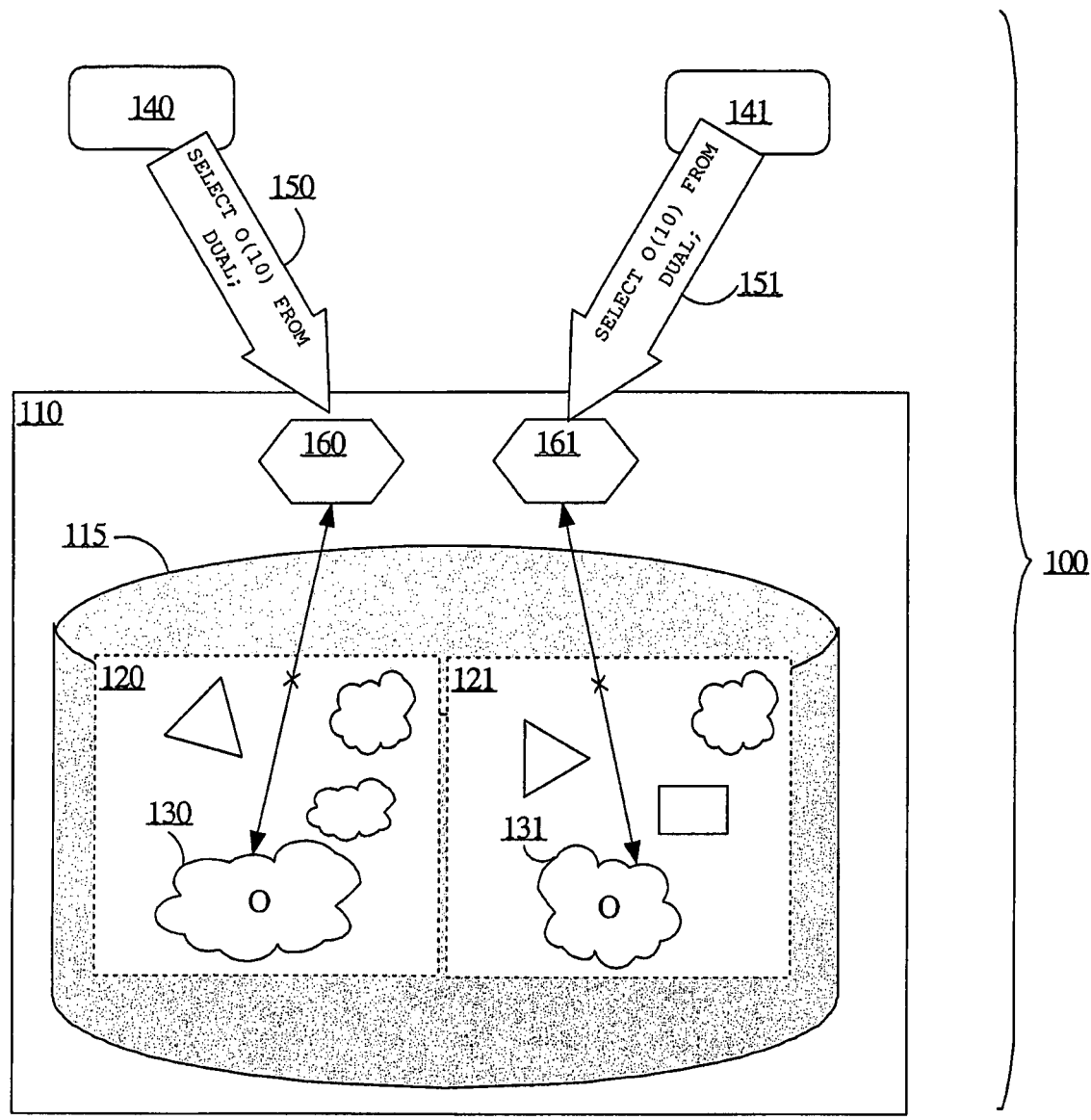
FIG. 1 is a block diagram of a database application that illustrates object editioning according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for concurrently maintaining an old edition and a new edition of one or more database objects. According to an embodiment, the database system maintains an object in a database. For that object, the database system maintains an old object edition and a new object edition. The database system executes an operation that references the object. During execution of the operation, the database system determines the edition with which the operation is associated. The database system then accesses the object edition that pertains to the edition associated with the operation.

According to an embodiment, a database system defines a view for data in a database. For the view, an old edition and a new edition maintain an old view edition and a new view edition, respectively. Each view edition defines a particular column; however, the old view edition maps the particular column to a first column in a table in the database, while the new view edition maps the particular column to a different, second column in a table in the database. The data values stored in the second column are transformed versions of the data values stored in the first column. The database system executes a query that references the particular column. During execution, the database system determines the edition with which the query is associated. The database system then accesses the particular column through either the old view edition or the new view edition, depending on the edition associated with the query. Thus, the query will access the data in the first column for the old edition, and the second column for the new edition.

According to an embodiment, editions do not necessarily comprise new copies of the clients, objects, or data. Rather, an edition may define certain objects or data to be mapped to pre-existing versions of the objects of data. For example, an old and new edition might both map the object O1 to the same representation of O1, while the old and new editions might each map the object O2 to different representations of O2. According to an embodiment, the database system creates new representations of resources for an edition only when the edition must make an incompatible change to the resource, thus reducing unwanted duplication of resources.

According to an embodiment, data is kept consistent between editions through the use of "cross-edition triggers." The database system stores trigger data in a database defining a forward trigger associated with a first column of data. When an operation, such as an operation initiated by an SQL DML ("data manipulation language") statement, accesses the first column of data, the database system executes the forward trigger as part of the execution of the operation. The forward trigger transforms a data value in the first column into a data value in a second column according to a predefined transformation. Such a transformation may be, for instance, a mathematical formula that converts yards to meters or a procedure that transforms data from a string to a date. The trigger data also defines a reverse trigger, whereby a data value in the second column may be transformed into a data value in the first column. When an operation accesses the second column of data, the database system executes the reverse trigger as part of the execution of the operation.

According to an embodiment, the forward trigger transforms data values from an old edition to a new edition, while the reverse trigger transforms data values from a new edition to the old edition. Thus, changes made to data in the old edition are automatically propagated to the new edition, and changes made to the data in the new edition are automatically propagated to the old edition. Because trigger execution is internal to the database system, the triggers may be executed as part of an operation. Standard locking mechanisms may ensure that the data remains consistent between versions at all times, thus overcoming the merge and ordering difficulties inherent to the synchronization techniques relied upon for upgrade approaches that require database replication.

In other embodiments, the invention encompasses a computer apparatus and a computer-readable medium configured to carry out the foregoing steps.

2.0. Object Editioning

According to an embodiment of the invention, a database may comprise editions to facilitate upgrades. Each edition comprises object editions for one or more objects within the database. For example, an object may have both an old object edition and a new object edition. The old object edition may be used for operations associated with pre-upgrade components of a database application, while the new object edition may be used for operations associated with post-upgrade components of the database applications.

2.1. Structural Overview

FIG. 1 is a block diagram of a database application 100 that illustrates object editioning according to an embodiment of the invention. Database application 100 relies on database system 110.

Database system 110 comprises editions 120 and 121 of a database 115. In turn, editions 120 and 121 comprise object editions 130 and 131, respectively. Object editions 130 and 131 are both object editions of an object O. Object O may be, for example, a view, table, stored procedure, or any other object within database 115. Object editions 130 and 131 may be, for example, separate and distinct versions of object O, with separate representations. Object editions 130 and 131 may also be, for example, mappings to the same representation.

Database 115 may also comprise objects that do not belong to any edition. Indeed, non-editioned objects may be desirable in some instances. For instance, the data editioning mechanism discussed in section 3.0, "Data Editioning," relies on view editions of a view of a non-editioned table.

According to an embodiment, editions 120 and 121 are layers of abstraction facilitated by metadata in database 115. For instance, database 115 may comprise a system table with rows for each edition. Database system 110 may also associate object editions 130 and 131 with their respective objects and editions through system metadata in database 115. For example, object editions may be defined in a system table with columns for the name of the object represented by the object edition and the edition or editions to which the object edition pertains. Several mechanisms for defining object editions are disclosed in section 5.2, "Mechanisms for Maintaining Object Editions."

Clients 140 and 141 are client-based applications coupled to database system 110. Clients 140 and 141 may be, for instance, standalone applications residing on a system that can communicate with database system 110. Clients 140 and 141 may also be applications running on application servers that interface with web browsers and other web clients.

Clients 140 and 141 send queries 150 and 151 to database system 110. Queries 150 and 151 may be, for instance, SQL DML statements. They may also be in any other known form for communicating with a database system. Database system 110, as a result of receiving and interpreting queries 150 and 151, may perform operations 160 and 161.

According to the embodiment depicted in FIG. 1, queries 150 and 151 reference object O. In fact, according to this embodiment, queries 150 and 151 are identical queries. However, queries 150 and 151 need not be identical. In fact, queries 150 and 151 need not even directly reference the object O—they need only be queries that result in operations 160 and 161 that reference the object O. Furthermore, an embodiment of the invention may not require clients 140 and 141 or queries 150 and 151 at all, instead requiring only that operations 160 and 161 reference object O.

Finally, operations 160 and 161 are associated with editions 120 and 121, respectively. Database system 110 may determine that operations 160 and 161 are associated with editions 120 and 121, respectively, in a variety of ways. For instance, it may look up the identity of the client requesting performance of the operation in a client-to-edition mapping, examine configuration parameters communicated by the client, or access session data associated with the operation of the client. Mechanisms for determining an associated edition are further discussed in section 5.1, "Determining an Associated Edition."

Because of their association with editions 120 and 121, respectively, database system 110 will automatically provide operations 160 and 161 with different object editions of object O. In this case, operation 160 will be performed with respect to object edition 130, while operation 161 will be performed with respect to object edition 131. Thus, even though clients 140 and 141 reference the same object O, they transparently access a different object edition for object O.

Facilitating Upgrades with Object Editions

According to an embodiment, editions 120 and 121 may be used to facilitate an upgrade to application 100. In this embodiment, edition 120 is an old (pre-upgrade) edition of database 115, comprising original or non-upgraded objects. Edition 121 is a new (post-upgrade) edition of database 115, comprising new and upgraded object editions. Client 140 may be an application that has not yet been upgraded. Client 141 may be a client that has been upgraded. Client 141 may also be a client that does not require an upgrade because its use of object O does not implicate a characteristic of object O being changed in the upgrade.

Indeed, one advantage of this embodiment is that a client may be less likely to require upgrading, due to the fact that the client does not have to be reconfigured to adjust to a new database or schema name. For instance, in a database replication approach an upgraded client 141 may have needed to access a replicated copy of database 115, as opposed to database 115. The different database may have had, for example, a different name, location, or user settings. Thus, client 141 would have required reconfigured to adjust to the different database.

Object edition 130 may comprise a version of object O that has not been upgraded. Thus, when the non-upgraded client 140 attempts to accesses object O, database system 110 automatically provides it with object edition 130 (i.e. the non-updated version of the object) as a result of the editioning mechanism. This behavior assures that components of the pre-upgrade version of the application will continue to run with pre-upgrade components.

Meanwhile, object edition 131 may comprise an upgraded version of Object O. When the upgraded client 141 attempts to access object O, database system 110 will provide it with object edition 131 (i.e. the upgraded version of object) as a result of the editioning mechanism. This behavior assures that the post-upgrade version of the application will run only with post-upgrade compatible components.

Upgraded components of the application 100 may run concurrently with non-upgraded components. For example, clients 140 and 141 may both access compatible editions of object O at the same time, even though client 140 may be a pre-upgrade component and client 141 may be a post-upgrade component. Thus, database application 100 may remain functional throughout the entire upgrade process, as upgraded objects and clients are gradually phased-in with the new edition.

According to an embodiment, object O may not require updating during the database application upgrade. Object edition 131 may instead point to the original version of object O. When an upgraded client 141 seeks access to object O, database system 110 will provide it with object edition 131 (which in this case points to the original version of object O) as a result of the editioning mechanism. Thus, this embodiment avoids the unnecessary duplication of objects. Mechanisms for pointing an object edition to a non-upgraded version of an object are discussed in section 5.2, "Mechanisms for Maintaining Object Editions."

2.2. Functional Overview

Figure 2:
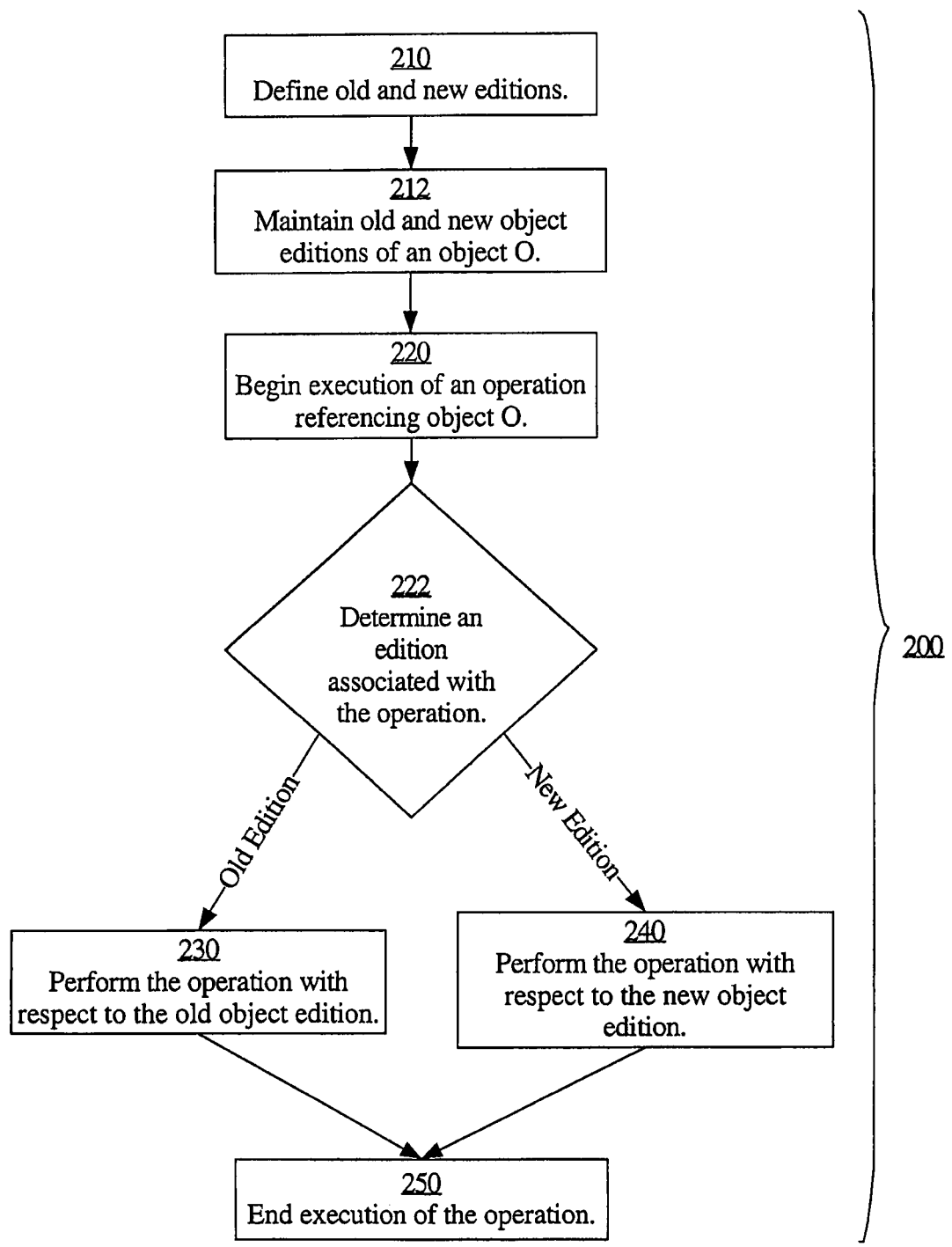
FIG. 2 depicts a flow diagram that illustrates an embodiment of a method for object editioning during a database application upgrade.

FIG. 2 depicts a flow diagram 200 that illustrates an embodiment of a method for object editioning during a database application upgrade, such as an upgrade to database application 100 of FIG. 1. In step 210, a database system, such as database system 110, stores editioning metadata defining an old edition and new edition in a database. For example, the editioning metadata may define editions 120 and 121.

In step 212, the database system maintains an old and new object edition for an object O. The old and new object editions are associated with the old and new edition, respectively. For example, the database system may maintain object editions 130 and 131, associated with editions 120 and 121 respectively.

In step 220, the database system begins executing an operation that references the object O. For example, the database system may execute an operation such operation 160 or 161. This operation may be the result of a query received from a client, such as queries 150 or 151 from client 140 or 141. This operation may also result from scheduled tasks or from other operations being executed by the database system.

In step 222, as part of executing the operation, the database system determines an edition with which the operation is associated. For example, if the operation resulted from a query by an upgraded client, the database system may determine the associated edition to be the new edition. Mechanisms for determining an associated edition are discussed in section 5.1, "Determining an Associated Edition."

If, in step 222, the operation is associated with the old edition, flow proceeds to step 230. In step 230, the database system performs the operation with respect to the old object edition for object O. For example, if the old object edition of the object O is compiled PL/SQL code, the database system would run the compiled PL/SQL code.

If, in step 222, the operation is associated with the new edition, flow proceeds to step 240. In step 240, the database system performs the operation with respect to the new object edition for object O. For example, the new object edition of the object O might be a recompiled version of the same PL/SQL code from step 230, and the database system would run the recompiled PL/SQL code.

In step 250, execution of the operation ends.

According to an embodiment, the new object edition of step 240 may initially point to the same version of the compiled PL/SQL code as the old object edition in step 230. The database system may detect that an operation associated with new edition will invalidate the compiled PL/SQL code, thus requiring recompilation. The database system then allocates space for a recompiled version of the PL/SQL code, to which the new object edition will now point.

3.0. Data Editioning

According to an embodiment of the invention, a database system may edition data. Pre-upgrade application components are automatically provided with old editions of data, while post-upgrade components are automatically provided with new editions of data. Data editioning may be used in tandem with object editioning, or by itself.

3.1. Structural Overview

Figure 3:
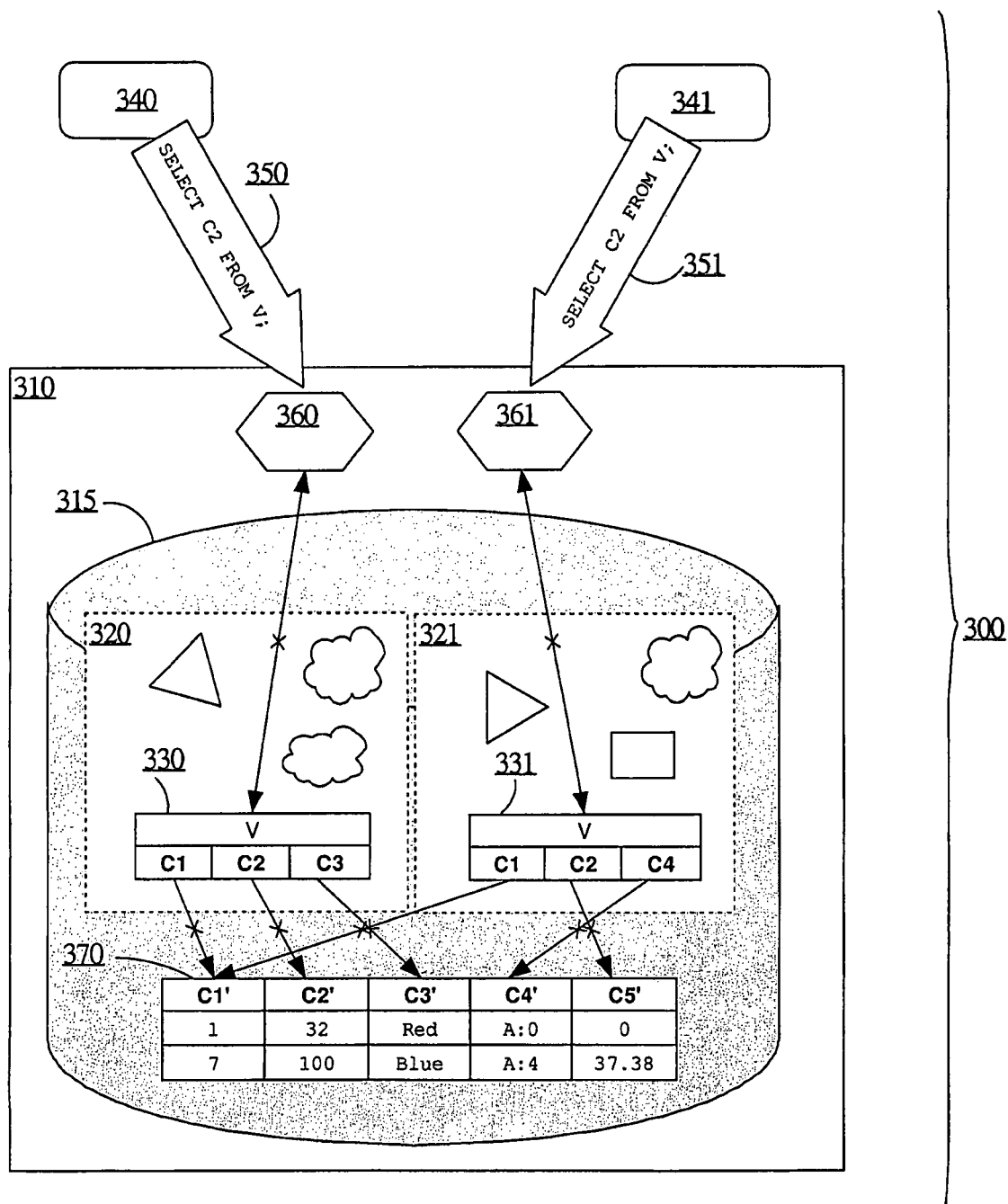
FIG. 3 is a block diagram of a database application that illustrates data editioning according to an embodiment of the invention.

FIG. 3 is a block diagram of a database application 300 that illustrates data editioning according to an embodiment of the invention. Database application 300 relies on database system 310.

Database system 310 comprises editions 320 and 321 of a database 315. In turn, editions 320 and 321 comprise view editions 330 and 331, respectively. View editions 330 and 331 may also be referred to as "editioning views." View editions 330 and 331 are both view editions of a view V. View V corresponds to table 370, which is a non-editioned object in database 315.

According to an embodiment, editions 320 and 321 are layers of abstraction facilitated by metadata in database 315. For instance, database 315 may comprise a system table with rows for each edition. Database system 310 may also associate view editions 330 and 331 with their respective objects and editions through system metadata in database 315. For example, view editions may be defined in a system table with columns for the name of the view represented by the view edition and the edition or editions to which the view object edition pertains. Mechanisms for view editions are discussed in "Facilitating Upgrades with Data Editions" below, as well as in section 5.2, "Mechanisms for Maintaining Object Editions."

View edition 330 comprises columns C1, C2, and C3. These columns are mapped to columns C1', C2', and C3' of table 370, respectively. View edition 331 comprises columns C1, C2, and C4. These columns are mapped to columns C1', C5', and C4' of table 370, respectively.

Table 370 is a non-editioned table in database 315. Table 370 comprises columns C1', C2', C3', C4', and C5'. Of particular interest in table 370 are columns C2' and C5'. The data values in C5' have been derived from a transformation of the data values in C2'. In particular, the data values in C5' have been converted from integer representations of degrees Fahrenheit in C2' to floating point representations of degrees Celsius in C5'. Transformations are discussed in greater detail in section 5.4, "Transformations."

Clients 340 and 341 are client-based applications coupled to database system 310. Clients 340 and 341 may be, for instance, standalone applications residing on a system that can communicate with database system 310. Clients 340 and 341 may also be applications running on application servers that interface with web browsers and other web clients.

Clients 340 and 341 send queries 350 and 351 to database system 310. Queries 350 and 351 may be, for instance, SQL DML statements. They may also be in any other known form for communicating with a database system. Database system 310, as a result of receiving and interpreting queries 350 and 351, may perform operations 360 and 361.

According to the embodiment depicted in FIG. 3, queries 350 and 351 reference column C2 of View V. In fact, according to this embodiment, queries 350 and 351 are identical queries. However, queries 350 and 351 need not be identical. In fact, queries 350 and 351 need not even directly reference column C2 of View V—they need only be queries that result in operations 360 and 361 that reference column C2 of View V. Furthermore, an embodiment of the invention may not require clients 340 and 341 or queries 350 and 351 at all, instead requiring only that operations 360 and 361 reference column C2 of View V.

Finally, operations 360 and 361 are associated with editions 320 and 321, respectively. Database system 310 may determine that operations 360 and 361 are associated with editions 320 and 321, respectively, in a variety of ways. For instance, it may look up the identity of the client requesting performance of the operation in a client-to-edition mapping, examine configuration parameters communicated by the client, or access session data associated with the operation of the client. Mechanisms for determining an associated edition are further discussed in section 5.1, "Determining an Associated Edition."

Because of their association with editions 320 and 321, respectively, database system 310 will automatically provide operations 360 and 361 with different view editions of View V. In this case, operation 360 will be performed with respect to view edition 330, while operation 361 will be performed with respect to view edition 331. Since view editions 330 and 331 comprise different mappings for column C2, operation 360 will manipulate the data in column C2' of table 370, while operation 361 will manipulate the data in column C5' of table 370. Thus, even though clients 340 and 341 reference the same column C2 of View V, they transparently access different columns of data in the table underlying View V.

Facilitating Upgrades with Data Editions

According to an embodiment, editions 320 and 321 may be used to facilitate an upgrade to application 300. In this embodiment, edition 320 is an old (pre-upgrade) edition of data, comprising original or non-upgraded data. Edition 321 is a new (post-upgrade) edition of data, comprising potentially updated data. Client 340 may be a client that has not yet been upgraded. Client 341 may be a client that has been upgraded.

Client 341 may also be a client that does not require an upgrade. For instance, if the data updates to View V do not require a change in the queries that client 341 issues, client 341 may not require upgrading. Also, if client 341 only dealt with data in database 315 that was not being upgraded, such as column C1 of View V, client 341 may not require upgrading.

The upgrade process, in this embodiment, requires transforming the data mapped to column C2 of View V. Pre-upgrade components of application 300, such as client 340, may have been coded to expect that the data values mapped to column C2 would be in degrees Fahrenheit. However, post-upgrade components of application 300, such as client 341, may have been coded to expect that the data values mapped to column C2 would be in degrees Celsius.

To facilitate this transformation of data, an upgrade would not want to transform the values in C2' directly, since doing so would cause errors in the still-running pre-upgrade components. Instead, the upgrade may create a new column C5' in table 370, wherein the upgrade may place the transformed values from C2'. The upgrade may then define view edition 331 to map column C2 to column C5' instead of C2'.

The upgrade may be programmed to select the name of columns and tables created for the upgrade, such as C5', using a predefined list or algorithm. Alternatively, placeholder names can be used during upgrade development, with the database system or intermediate software determining an actual name during the actual upgrade process.

As a result of the editioning mechanism, when the non-upgraded client 340 attempts to access C2, database system 310 automatically provides it with non-transformed data from C2'. Meanwhile, when the upgraded client 341 attempts to access C2, database system 310 will provide it with transformed data from C5'.

Upgraded components of the application 300 may therefore run concurrently with non-upgraded components without errors from incompatible data. Thus, database application 300 may remain functional throughout the entire upgrade process, as upgraded data and clients are gradually phased-in with the new edition.

Using this approach, database application 300 avoids unnecessary duplication of data. For instance, both view edition 330 and 331 define a column C1. The data mapped to this column does not change during the upgrade process. A database replication approach may have required that this column be replicated along with the rest of table 370. However, according to this embodiment, the same column of data—C1'—underlies column C1 in both view edition 330 and 331. Thus, C1 has not been unnecessarily duplicated.

According to an embodiment of the invention, code accessing data in database 315 (such as the code for clients 340 and 341) should, as much as possible, refer to data only through view editions that map to columns of data in database 315, as opposed to the tables containing the data directly. For example, clients 340 and 341 should reference view V in their queries instead of table 370, even though table 370 directly stores the data that view V references. This reduces the number of changes necessary to clients 340 and 341. For example, client 340 could have achieved the same functionality as query 350 through a query that referenced column C2' of table 370 instead of column C2 of view V. However, if client 341 were an upgraded version of such a client 340, client 341 would have to be changed to reference column C5' of table 370 instead of column C2'. On the other hand, because the depicted client 340 references column C2 of view V, the upgrade process may avoid changing client 340's code to reflect the fact that C5' now contains the data that client 340 needs to access. The upgrade needs only to remap column C2 in view edition 331.

According to an embodiment, a database system may ensure that code accesses underlying data through view editions instead of underlying data directly by requiring that each table be represented by a view. The view may be defined by a potentially different view edition in each edition. Using metadata, the database system may mark this view as special, in that the view should always be used to access the table which it represents. In each edition, the view edition of the special view should comprise only simple mappings to those columns of the represented table considered still valid for the edition. The database system may explicitly require that code reference the view instead of the table.

Alternatively, View V does not necessarily need to correspond to a single table—in fact, View V may map data from any number of tables in database 315.

Using this approach, a client may be less likely to require upgrading, due to the fact that the client does not have to be reconfigured to adjust to a new database or schema name. For instance, in a database replication approach, an upgraded client 341 may have needed to access a replicated copy of database 315, as opposed to database 315. The different database may have had, for example, a different name, location, or user settings. Thus, client 341 would have required reconfiguration to adjust to the different database.

3.2. Functional Overview

Figure 4:
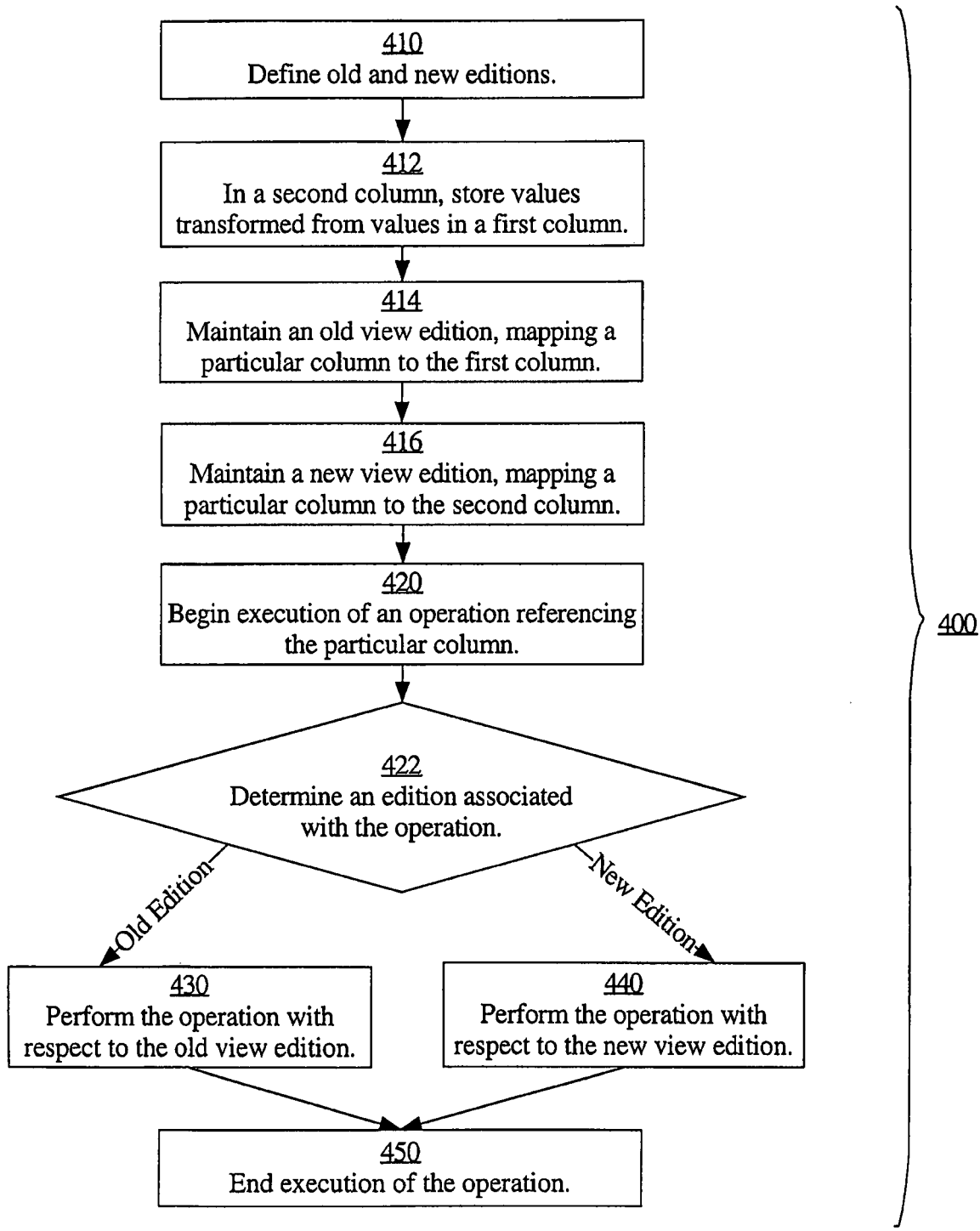
FIG. 4 depicts a flow diagram that illustrates an embodiment of a method for data editioning during a database application upgrade.

FIG. 4 depicts a flow diagram 400 that illustrates an embodiment of a method for data editioning during a database application upgrade, such as an upgrade to database application 300 of FIG. 3. In step 410, a database system, such as database system 310, stores editioning metadata defining an old edition and new edition in a database. For example, the editioning metadata may define editions 320 and 321.

In step 412, the database system stores transformed data values in a second column of the database. The transformed data values derive from a transformation applied to the data values in a first column of the database. For example, the database system may store column C5' of table 370, derived from a transformation of column C2' of the same table. Transformations are discussed in greater detail in section 5.4, "Transformations."

In step 414, the database system maintains an old view edition of a view V in the database. The old view edition maps a particular column to the first column. For example, the database system may maintain view edition 330, which defines the column C2 and maps it to column C2' of table 370. The database system associates the old view edition with the old edition.

In step 416, the database system maintains a new view edition of a view V. The new view edition maps a particular column to the second column. For example, the database system may maintain view edition 331, which defines the column C2 and maps it to column C5' of table 370. The database system associates the new view edition with the new edition.

In step 420, the database system begins executing an operation that references a particular column of view V. For example, the database system may execute operation 360 or 361. This operation may be the result of a statement received from a client, such as queries 350 or 351 from client 340 or 341. This operation may also result from scheduled tasks or from other operations being executed by the database system.

In step 422, as part of executing the operation, the database system determines an edition with which the operation is associated. For example, if the operation resulted from a statement issued by an upgraded client, the database system may determine the associated edition to be the new edition. Mechanisms for determining an associated edition are discussed in section 5.1, "Determining an Associated Edition."

For example, operation 360 resulted from a query 350 by client 340. The database application may associate client 340 with edition 320 because client 340 expects certain data to be in degrees Fahrenheit. (As previously indicated, edition 320 comprises a view edition 330 that maps column C2 to values in degrees Fahrenheit). Also, operation 361 resulted from a query 351 by client 341. The database application may associate client 341 with edition 321 because client 341 expects certain data to be in degrees Celsius.

If, in step 422, the operation is associated with the old edition, flow proceeds to step 430. In step 430, the database system performs the operation with respect to the old view edition for view V. Thus, when the operation references data values from the particular column of view V, the database system provides values from the first column.

For example, the database system may determine that operation 360 is associated with edition 320. Edition 320 maintains view V as view edition 330. Therefore, to the extent that operation 360 concerns the view V, the database system will perform operation 360 with respect to view edition 330. Operation 360 references column C2 of view V. Since column C2 of view V is mapped to column C2' of table 370, the database system uses values from column C2' any time operation 360 references column C2. Thus, operation 360 returns a result set comprising the values {32, 100}.

If, in step 422, the operation is associated with the new edition, flow proceeds to step 440. In step 440, the database system performs the operation with respect to the new view edition for view V. Thus, when the operation references data values from the particular column of view V, the database system provides values from the second column.

For example, the database system may determine that operation 361 is associated with edition 321. Edition 321 maintains view V as view edition 331. Therefore, to the extent that operation 361 concerns the view V, the database system will perform operation 361 with respect to view edition 331. Operation 361 references column C2 of view V. Since column C2 of view V is mapped to column C5' of table 370, the database system uses values from column C5' any time operation 361 references column C2. Thus, operation 361 returns a result set comprising the values {0, 37.78}.

In step 450, execution of the operation ends.

4.0. Cross-Edition Triggers

According to an embodiment of the invention, a database system may maintain consistency between editions of data through the use of cross-edition triggers. Triggers are units of procedure code stored within a database, such as code in PL/SQL, run by the database system as part of each operation that modifies data stored in an object with which the trigger is associated. Typically a trigger is associated with an object such as a column, table, or view. A change to the column or table or a change directed to a view may invoke execution of the trigger. Triggers may be associated with database objects by DDL commands, which may specify also specify conditions under which a trigger is executed.

Cross-edition triggers may include forward triggers and reverse triggers. A forward trigger may be associated with an object, such as a column of a table, that is accessed by operations associated with the old edition. The forward trigger may comprise code that performs a transformation on data inside the associated object from the old edition to the new edition. The forward trigger copies the transformed data to an object accessed by operations associated with the new edition. A reverse trigger may then be associated with the object accessed by operations associated with the new edition. The reverse trigger comprises code that performs a reverse transformation—that is to say, it changes data in the object associated with the reverse trigger from the new edition to the old edition. The reverse trigger copies the transformed data to the object accessed by operations associated with the old edition. Used in tandem, forward and reverse triggers keep data tightly synchronized between editions. The use of data editioning with cross-edition triggers may be referred to as "Online Transforms."

According to an embodiment, a forward trigger may be marked with the syntax "FORWARD CROSSEDITION," declaring that it is upgrade-related and moves data in the direction from the pre-upgrade version of the application towards the post-upgrade version of the application. Reverse triggers may be marked with the syntax "REVERSE CROSSEDITION," declaring that it is upgrade-related and moves data in the direction from the post-upgrade version of the application towards the pre-upgrade version of the application. Such marking may, among other aspects, facilitate better maintenance of a particular edition. Alternative syntax may also be used.

4.1. Structural Overview

Figure 5:
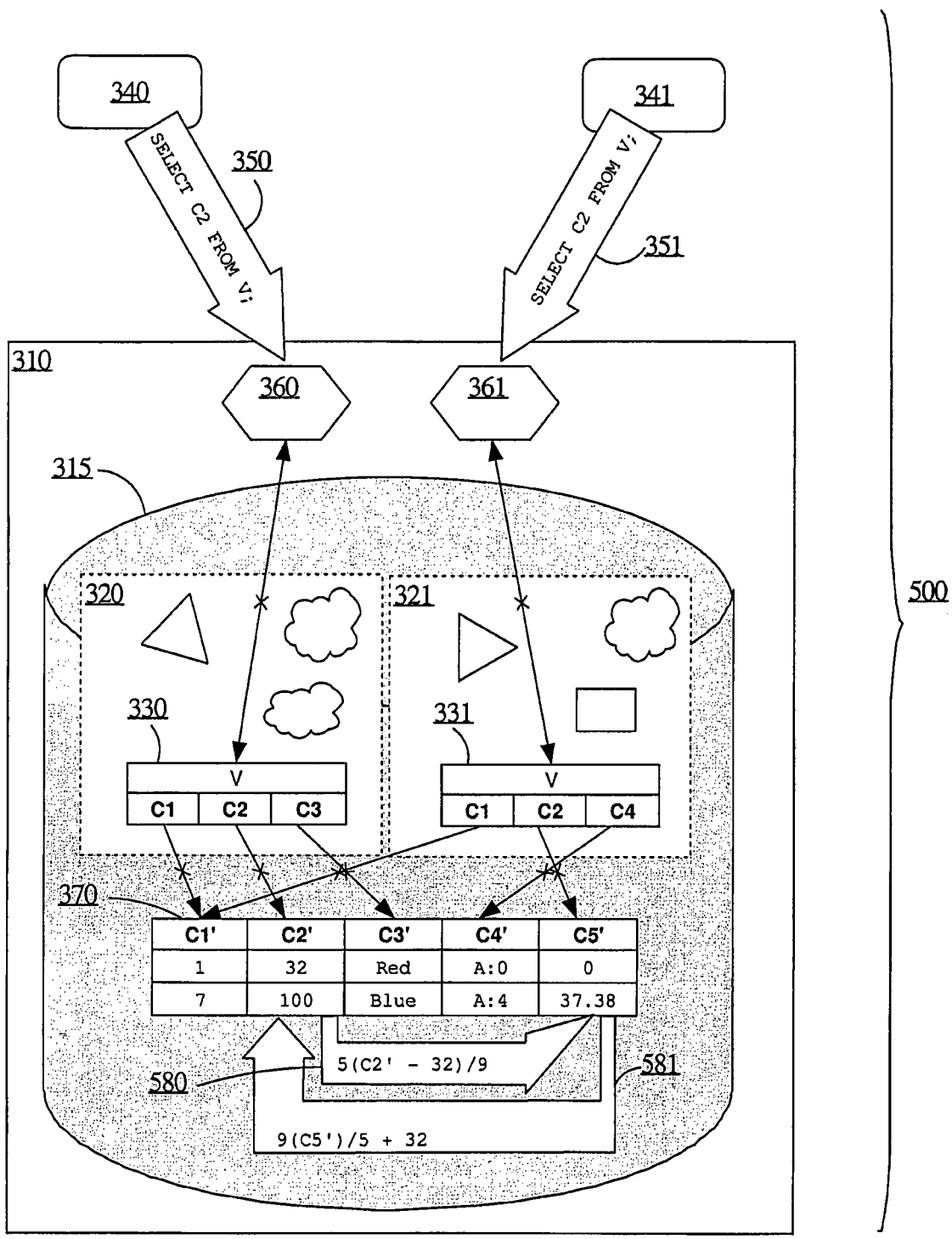
FIG. 5 is a block diagram of a database application that illustrates data editioning according to an embodiment of the invention.

FIG. 5 is a block diagram of a database application 500 that illustrates the use of cross-edition triggers according to an embodiment of the invention. Database application 500 is the same as database application 300 of FIG. 3, with the addition of triggers 580 and 581.

Trigger 580 is a forward trigger. Trigger 580 defines a transformation of data values from column C2' of table 370 to column C5' of table 370. In this case, the transformation comprises recasting the data type, followed by applying a mathematical formula. This transformation may be implemented, for example, by PL/SQL code.

Trigger 581 is a reverse trigger. Trigger 581 defines a transformation of data values from column C5' of table 370 to column C2' of table 370. In this case, the transformation comprises recasting the data type, followed by applying a mathematical formula. The recasting and the mathematical formula operate in inverse to the transformation depicted for trigger 580. This transformation may also be implemented, for example, by PL/SQL code.

Trigger 580 is associated with column C2'—in other words, database system 310 will execute trigger 580 any time it determines that an operation will modify data in C2'. Trigger 581 is associated with column C5'—in other words, database system 310 will execute trigger 580 any time it determines that an operation will modify data in C5'. Triggers 580 and 581 may be associated by other means as well, such as to table 370 generally. Triggers 580 and 581 are conceptually associated with editions 320 and 321, respectively, in that they are associated with objects whose data pertains to editions 320 and 321, respectively. While database system 310 does not necessarily explicitly associate triggers with editions, database system 310 may nonetheless associate triggers with editions.

Facilitating Upgrades with Cross-Edition Triggers

According to an embodiment, triggers 580 and 581 may be used to facilitate an upgrade to application 300. In this embodiment, edition 320 is an old (pre-upgrade) edition of data, comprising original or non-updated data. Edition 321 is a new (post-upgrade) edition of data, comprising potentially updated data. Client 340 may be a client that has not yet been upgraded. Client 341 may be a client that has been upgraded.

Clients 340 and 341 may rely on database system 310 to provide and store temperature data. Client 340 may have been designed to expect data in degrees Fahrenheit, while client 341 may have been designed to expect data in degrees Celsius. To facilitate the upgrade of client 340 to client 341 without having to take client 340 offline, an upgrade may create column C5' in table 370. The upgrade may populate column C5' with the same data as C2', except that the data may be transformed from degrees Fahrenheit to degrees Celsius. In accordance with the data editioning mechanism previously discussed, these steps would allow the upgrade to concurrently offer for use both the pre-upgrade (degrees Fahrenheit) and post-upgrade (degrees Celsius) versions of the application.

If database application 300 continues to change values while both clients 340 and 341 are running, the upgrade may deploy cross-edition triggers to maintain consistency between the pre-upgrade view of C2 (i.e. column C2') and the post-upgrade view of column C2 (i.e. column C5'). The upgrade may deploy, for example, triggers 580 and 581.

Trigger 580 assures that data changes to C2'—in other words, to the column that the old edition perceives as C2 in view V—are automatically and instantly propagated to C5'—in other words, to the column that the new edition perceives as C2 in view V. For example, if an operation associated with the old edition were to change the first value of C2 in view V to 50 degrees Fahrenheit, database system 310 would detect that C2' had been modified and, as part of the operation, execute trigger 580. Trigger 580 would apply its transformation to the first value of C2' (50 degrees Fahrenheit). Trigger 580 would then replace the first value in C5' with the transformed value. Thus, the first value of C5' would be changed to 10 degrees Celsius.

Trigger 581 assures that data changes to C5'—in other words, to the column that the new edition perceives as C2 in view V—are automatically and instantly propagated to C2'—in other words, to the column that the old edition perceives as C2 in view V. For example, if an operation associated with the new edition were to change the first value of C2 in view V to 10 degrees Celsius, database system 310 would detect that C5' had been modified and, as part of the operation, execute trigger 581. Trigger 581 would apply its transformation to the first value of C5' (10 degrees Celsius). Trigger 581 would then replace the first value in C2' with the transformed value. Thus, the first value of C2' would be changed to 50 degrees Fahrenheit.

According to an embodiment, upgrade-related trigger code should directly refer to columns of data with which it is associated or that it modifies. Therefore trigger code should refer to data via the tables' names and the table-level column names directly rather than referencing the data through view editions.

According to an embodiment, cross-edition triggers are executed during the execution of operation 360 or 361. Thus, the modified data pertaining to the triggering edition and the transformed data pertaining to the targeted edition are written into database 315 as part of the same database transaction, and so are never noticeably out of sync with each other. According to an embodiment, as known in the art, normal database locking mechanisms may prevent any other operation from modifying data in the columns implicated by the triggers until the transaction completes. For example, database system 310 may lock table 370 upon beginning execution of operation 360 or 361. If the triggers were associated with or were to implicate columns in another table, locking mechanisms as known in the art could also lock the other table or columns.

Thus, cross-edition triggers are a mechanism by which a database system can internally and automatically facilitate data synchronization between editions during an upgrade without merge and ordering problems. The pre-upgrade version of an application and the post-upgrade version of the application are kept fully synchronized in that they both see the changes made by each other, and can both be blocked by locks set by the other, even though they may be referencing separate copies of the data items that the upgrade modifies.

4.2. Functional Overview

Figure 6:
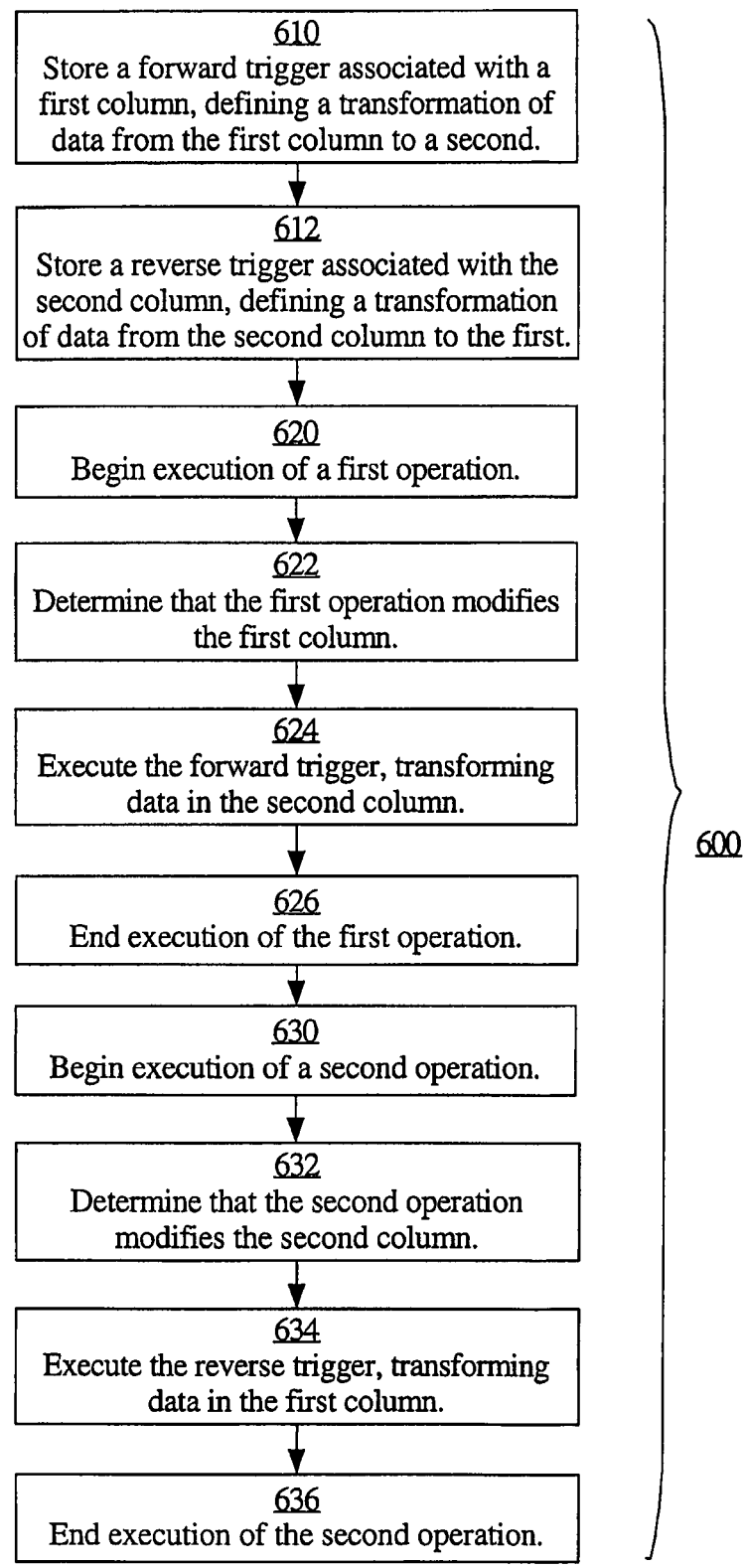
FIG. 6 depicts a flow diagram that illustrates an embodiment of a method for employing cross-edition triggers during a database application upgrade.

FIG. 6 depicts a flow diagram 600 that illustrates an embodiment of a method for employing cross-edition triggers during a database application upgrade, such as an upgrade to database application 500 of FIG. 5. In step 610, a database system, such as database system 310, stores data defining a forward trigger associated with a first column and comprising a transformation of data values from the first column to a second column in a database. The forward trigger may be expressed by, for example, PL/SQL code. The forward trigger may be, for example, trigger 580, which is associated with column C2' of table 370.

In step 612, the database system stores data defining a reverse trigger associated with the second column and comprising a transformation in reverse of the one defined by the first transformation (i.e. a transformation of data values from the second column to the first column). The reverse trigger may be expressed by, for example, PL/SQL code. The reverse trigger may be, for example, trigger 581, which is associated with column C5' of table 370.

In step 620, the database system begins executing a first operation. The operation may result from a statement received from a client or from another database system operation. For example, the operation may result from a statement received from a client that has not yet been updated to work with data values of the type found in the second column. This client may be, for example, a client associated with a pre-upgrade edition of the database, such as client 340.

In step 622, as part of executing the first operation, the database system determines that the operation modifies a data value in the first column. For example, the operation may have resulted from an UPDATE operation on column C2 of view edition 330. Due to the mapping of column C2 in view edition 330 to column C2' of table 370, the UPDATE operation could change the first value of column C2' to 50. The operation need not actually result in a substantive change to a data value. Rather, a database system may consider an operation to have modified a data value even though it only redundantly "UPDATES" a data value to be the same data value.

In response to the determination of step 622, the database system executes the forward trigger in step 624, thereby transforming a data value in the second column based on the transformation defined by the forward trigger as applied to a modified value in the first column. For example, if the first value in C2' has been modified to 50, the forward trigger may execute PL/SQL code that performs the forward transformation depicted by trigger 580. Thus, the first value in C5' will be transformed to 10.

In step 626, the database system ends the first operation.

In step 630, the database system begins executing a second operation. The operation may result from a statement received from a client or from another database operation. For example, the operation may result from a statement by a client that has been updated to work with data values of the type found in the second column. This client may be, for example, a client associated with a post-upgrade edition of the database, such as client 341.

In step 632, as part of executing the operation, the database system determines that the operation modifies a data value in the second column. For example, the operation may have resulted from an UPDATE operation on column C2 of view edition 331. Due to the mapping of column C2 in view edition 331 to column C6' of table 370, the UPDATE operation could change, for example, the first value of column C5' to 10. The operation need not actually result in a substantive change to a data value. Rather, a database system may consider an operation to have modified a data value even though it only redundantly "UPDATES" a data value to be the same data value.

In response to the determination of step 632, the database system executes the reverse trigger in step 634, thereby transforming a data value in the first column based on the transformation defined by the reverse trigger as applied to the modified value in the first column. For example, if the first value in C5' has been modified to 10, the forward trigger may execute PL/SQL code that performs the reverse transformation depicted by trigger 581. Thus, the first value in C2' will be transformed to 50.

In step 636, the database system ends the second operation.

Steps 630 through steps 636 may be performed at any time in relation to steps 620 through 626, including before, after, and during the first operation. Normal database locking mechanisms may prevent execution of the second operation from changing data in column C5' during the time between modification of data in column C2' and the end of execution of the first trigger. Likewise, locking mechanisms will prevent the first operation from changing data in column C2' during the time between modification of data in column C5' and the end of execution of the first trigger.

The steps of flow 600 may also be integrated with the steps of flow 400. For example, steps 420 and 620 may be the same steps, as may be steps 420 and 630. Steps 450 and steps 636 may be the same steps, as may be steps 450 and 626. Steps 622 and 624 may be performed during step 430. Steps 632 and 634 may be performed during steps 440.

5.0. Implementation Examples

The following section describes various approaches for implementing object editioning, data editioning, and cross-edition triggers. The list is not intended to be exclusive. Those skilled in the art will recognize that many alternative approaches may be used.

5.1. Determining an Associated Edition

According to an embodiment, a database system may determine an edition associated with an operation based upon the identity of the client. For example, the database system may store metadata associating clients with editions. An upgrade may update this metadata as upgraded clients are "phased-in" to the database application.

According to an embodiment, a database system may determine an edition associated with an operation based upon session data associated with a query that invoked the operation. For example, client 140 of FIG. 1 may invoke a session with database system 110 to issue query 150. Database system 110 would store information about this session as session data in its system tables. Database system 110 may associate an edition with the session using the session data. Database system 110 may determine an associated edition based on, for example, the existence or non-existence of configuration parameters during session initialization. The configuration parameters might specify, for example, an explicit edition, an expected data format for identified data, or a last compiled time or application version that the database system may associate with an edition in metadata.

According to an embodiment, a client may change its choice of edition by issuing a statement to the database system. For example, client 140 might change its associated edition by issuing an ALTER SESSION SET EDITION statement to the database system An application need not include any version or edition information as part of the references it makes to database objects. However, according to an embodiment, a client may specify in a query explicit edition information about the object it references. The database system may chose to provide the object edition explicitly referenced even if that object edition has been superseded by the client's associated edition. For example, client 141 could specifically ask for object edition 130 using specially provided syntax in query 151, by which database system 110 would determine that the reference to object O in operation 161 should be associated with edition 120 instead of edition 121.

5.2. Mechanisms for Maintaining Object Editions

According to an embodiment, a database system may maintain multiple editions of objects by adding a new component to each object's name, so that each object is directly identifiable using a name composed of the edition name, schema name, and object name. However, this approach does not directly support sharing a single representation of each object that is not modified as part of an upgrade. Rather, each object edition, modified or not, would have its own complete copy of the object. To create a new post-upgrade edition that inherits the objects visible in the pre-upgrade edition, each object existing in the pre-upgrade edition would need to be fully copied, creating a corresponding but separate object edition labeled with the post-upgrade edition.

According to an embodiment, post-upgrade editions do not initially create new versions of objects. Thus, their object editions link to the previous version of the object. This means that, for example, an upgrade may not initially compile a representation of an object for a new edition, even though the upgrade may eventually decide to update the object. Instead, the new object edition would link to a previously compiled representation already existing within the database.

According to an embodiment, any change to an object occurring within an operation that is associated with a post-upgrade edition implicitly creates a new version of that object unless there is already a new version of that object associated with the post-upgrade edition. Alternative embodiments might choose to require an explicit step to create a new version of an object. Meanwhile, any change occurring within an operation that is associated with the pre-upgrade edition modifies the version of the object associated with the pre-upgrade edition. Or, the change creates a new object associated with the pre-upgrade edition if no object with the specified name already exists in that edition.

According to an embodiment, references between objects are tracked so that if one object's definition makes use of a property of another object's definition, the first object is adjusted if that property is changed. The change of a property of one object occurring as part of an upgrade may also implicitly cause the creation of a new version of any other objects that may depend upon that property for each dependent object that does not already have a new version associated with the post-upgrade edition. The post-upgrade edition's version of each dependent object will be modified to reflect the change in the property of the first object.

Object editions may be maintained in the manner disclosed in this application using a variety of techniques, four of which are described below.

Stubs

According to an embodiment, the presence of an object edition in a database is represented in a system table. This table maps a schema name and object name combination to an object identifier number. The representation of the content of the object is maintained separately, locatable via the object identifier number. When a new post-upgrade edition is created, for each object edition existing in the pre-upgrade edition, the database system creates a new object edition. To represent the new object edition, a new entry in the system table is created representing an object with the same schema name and object name, but labeled with the post-upgrade edition. The entry for the new object edition may be considered a "stub."

Each stub entry has its own unique object identifier number. However each stub also provides the object identifier number of a linked object edition. Using the linked object edition, a database system may locate the desired contents for an object without needing a separate representation of those contents for the implicated object edition.

When an attempt is made to modify an object, and that object is present as a stub in the edition in which the attempted modification is occurring, the stub is replaced with a more complete copy of the original object. Thus, the implicated object edition no longer links to the linked object edition, but stores its own copy that will be modified. The database system would also modify the stub entries for objects editions associated with editions that chronological follow the implicated edition, so that the subsequent object editions link to the implicated object edition as their linked object edition (i.e. the source of their contents).

Alternatively, the stub in each edition may reference the object or stub in the immediately prior edition. More effort would be needed to resolve to the final actual object when loading the contents, but less effort would be needed when an intermediate stub object became a normal complete object.

The specific system table representation may be replaced by various alternatives. Any representation with behavior similar to what are commonly termed "symlinks" or "hardlinks" may be used, accompanied by a mechanism to replace each link with a more complete copy of the relevant object when that object is modified within a specific edition, so that the modification does not affect the version of the object visible in prior editions.

Combined Metadata for Schemas and Editions

According to an embodiment, editions may be represented as a new field in each necessary structure representing the name of an object. Alternatively, a new identifier number may be used to represent each schema in each edition. In this implementation, the number of identifiers will be equal to the number of schemas times the number of editions that are, or have been, present in the database, with the exception that non-editioned schemas do not receive new identifier numbers for each edition. These additional identifier numbers may be referred to as "auxiliary schemas." As each identifier value corresponds to a unique combination of edition and schema, a single value may represent both the edition and schema aspects of an object's name, thereby defining object editions.

According to an embodiment, some aspects of the database implementation may make use of this combined metadata, while others may represent the edition and schema separately. The choice of which style of metadata is used in each aspect of an implementation depends on the constraints of existing structure definitions and code.

Edition Ranges

According to an embodiment, if editions are restricted so that each edition can have only one direct descendent, a database system may internally represent editions by monotonically increasing (or, monotonically decreasing) identifier values. Instead of labeling each object edition as pertaining to a single edition, each object edition may be labeled with the low and high bounds of the editions in which the version of the object associated with the object edition should be visible. For example, if editions 1-2 uses a first representation of an object, while editions 3-5 use a second representation of an object, the database system may maintain two object editions. The first object edition, associated with the first representation, may be defined as valid for the edition range 1-2, while the second object edition, associated with the second representation, may be defined as valid for the edition range 3-5.

One implementation of edition ranges might leave the high bound on an object edition unpopulated until a replacement for the corresponding object representation is created in some new edition. At that time, the object edition being replaced would have its high bound populated to represent that it is visible in the prior edition, but not in the one containing its replacement.

Edition Validity Bitmaps or Lists

According to a variation of edition ranges, each object edition may contain a bitmap, list, or other form of representation noting the specific editions in which that object edition should be visible. This variation may support multiple descendents of the same edition. For example, each edition created in the database may be assigned an identifier that is mapped to a specific bit in a bit vector. The proper object edition for use in a given edition can be identified by virtue of it being the only object with the given schema name and object name whose bit associated with that edition is on.

5.3. Dropped Objects and Changed Object Types

According to an embodiment, an object may be "dropped" (i.e., appear to not be present) in a post-upgrade edition even if an object of the same name is present in the pre-upgrade edition. According to another embodiment, an object name may be used in the post-upgrade edition for a different type of database object than the object edition that had shared its name in the pre-upgrade edition. This may be true regardless of whether the replacement object naturally serves the same sort of purpose. For example, a synonym in the pre-upgrade edition might be replaced by a view in the post-upgrade edition; or a stored procedure package might be replaced by a function or by a view.

To facilitate these embodiments, a database system may feature nomenclature or other means to explicitly represent "non-existent" object editions. When resolving an object reference to a representation from a SQL statement or from PL/SQL code, a database system may treat a so-designated non-existent object edition as if the implicated object does not exist. Thus, an upgrade may represent an object being dropped in the post-upgrade edition by creating a non-existent object edition, with the desired schema name and object name, associated with the post-upgrade edition. A non-existent object edition may subsequently be replaced using a CREATE statement to create a real object in its place. The created object need not be the same type of database object as had been present in an earlier edition.

5.4. Transformations

According to an embodiment, a transformation of data values from one edition to another may comprise changing the type of data. For example, a data value in an old edition may be stored as a string. The upgraded database application, however, may need to store the data value as a date in a new edition. The transformation may then recast the string as a date.

According to an embodiment, a transformation of data values may be performed according to a mathematical formula or function. The mathematical formula or function may be represented by, for example, units of PL/SQL code. For example, data in an old edition may represent customer order numbers as integers. The upgraded database application may need to modify the customer order numbers to accommodate a new ordering system. The transformation may use a mathematical formula to transform the old customer order number to a new customer order number.

According to an embodiment, different types of transformation may be used in tandem. For example, the transformation described by trigger 580 of FIG. 5 comprises, first, converting the data values from type integer to floating point, and second, applying a mathematical formula to the values that converts them from degrees Fahrenheit to degrees Celsius.

One skilled in the art will recognize that any type of data transformation is possible. For example, other data type conversions are possible, such as from an integer to a date or string. Simpler or more complex mathematical formulas may be applied. The transformation may comprise both less and more steps. Other types of data transformations may also be possible as known in the art.

Furthermore, a transformation may be based on data values from more than one column. A transformation may also change data values in more than one column. The columns on which the transformation is based, or that which the transformation affects, need not even reside in the same table.

Transformations Requiring the Manipulation of Rows

According to an embodiment, a transformation may insert or delete entire rows of data. Making these changes in an existing, non-editioned table may have an undesirable effect on the pre-upgrade version of the application, since the added or deleted row may be visible in each column mapped from the table, regardless of the view edition. Instead of manipulating a row directly, an upgrade may introduce a "replacement table" to hold the data that should be present in the post-upgrade version of the application.

A view edition that references the existing table should be redefined in the upgrade to reference the replacement table. The replacement table may still be populated using the mechanisms discussed throughout this disclosure, with the exception that triggers that create new rows may need to be designed to properly handle cases when the related row in the replacement table has already been created. When running within the pre-upgrade version of the application, the code of such a trigger may detect that the row has already been added and fall back to using an UPDATE statement instead of an INSERT. In this manner, a duplicate row is not created, but the most current set of values is propagated into the row. When running in the data initialization phase, however, the database system may skip any row it finds already present.

To aid in detecting duplicate rows, a unique index may be created on the replacement table to create a logical sense of identity for the rows in that table. Various database mechanisms, such as DML error logging, exception blocks, and bulk SQL with SAVE EXCEPTIONS, may then be used to detect and handle violations of the unique constraint on that index. Similar cases may arise when data is being moved from one table to a fully new table, for example, in order to permit the storage of multiple items instead of a single item of data per row of the existing table.

Alternatively, view editions may be defined in such a manner so as to hide the addition or deletion of a row. The code necessary to define such a view may, however, be difficult or tedious to produce.

Other Considerations

According to an embodiment, there may also be cases in which a data change requires access to data in a manner that is disallowed by mutating table restrictions or locking concerns. In such cases, an upgrade may introduce an "auxiliary table" holding a copy of the necessary data separate from the table in which the primary copy of that data is stored. These cases should be handled in an upgrade using the same replacement table mechanisms as discussed above in the context of row manipulation.

5.5. Initializing Transformed Columns of Data

According to an embodiment, forward triggers may be used to initially populate transformed data in the new edition (i.e. the post-change data). For example, trigger 580 of FIG. 5 may be used to initially fill in the values of column C5'. Trigger 580 could be deployed before C5' contains any data values. The upgrade could then initiate one or more operations that would cause trigger 580 to execute. For example, the upgrade could issue a routine "UPDATE" statement for the data values in column C2'. Although this UPDATE statement might not result in any actual value changes in C2', database system 310 may nonetheless perceive that this statement modifies C2', thereby initiating trigger 580.

According to an embodiment, this processing of pre-upgrade data by the upgrade may be performed using multiple SQL update statement executions, each visiting a subset of the existing rows of the database table. Each of these update executions can occur in a separately-committed database transaction, and these executions can be distributed amongst multiple database sessions operating in parallel.

This method of initially populating transformed data by running trigger code may sometimes be replaced by potentially faster means. For example, for some transformations, a database system may use insert or update statements that directly query from the table containing the existing data, then store into the table into which the data is moving. Doing so may be faster as it bypasses various operations involved in performing an update on the table containing the existing data and running the code of the trigger to process each row.

According to an embodiment, some upgrade-related triggers may rely for input on data outputted by other upgrade-related triggers. Thus, the triggers may initialize post-upgrade data in phases, wherein the upgrade executes in each phase only those triggers whose input data has been completely determined. Once an upgrade has executed all of the triggers conceptually associated with a given phase, the upgrade can proceed to build indexes and enable constraints on the post-upgrade data. It can then proceed with running still-remaining triggers related to any other bug fixes or feature additions for which the post-upgrade data of this just-completed phase is the last of the required input data to become available.

5.6. Dealing with Multiple Triggers

According to an embodiment, triggers may be designed to take into account the possibility that they may be initiated more than once. For example, some upgrade processes may execute a trigger more than once during initialization phase of the upgrade process. A first trigger may be executed directly by the upgrade. The upgrade may subsequently indirectly execute the first trigger by executing another trigger that modifies the data with which the first trigger is associated. Thus, the code present in the triggers may be written in a manner safe to apply multiple times to the same data.

According to an embodiment, the upgrade may be designed so as to avoid running triggers multiple times with respect to the same data.

Trigger Consolidation

According to an embodiment, the database system may consolidate multiple individual triggers associated with the same object into combined triggers, thereby optimizing trigger performance. The database system may perform such consolidations automatically. It may also facilitate such consolidations by providing one interface to create a fragment of a trigger and another interface to cause a specified collection of fragments to be gathered and syntactically composed into a properly written complete trigger. Alternatively, this consolidation may be performed manually or by tools external to the database system.

Upgrade-Related Trigger Ordering

According to an embodiment, multiple triggers may be enabled on the same table, each wishing to use the post-upgrade output of some prior trigger as the pre-upgrade input to its own operation. The order in which the various triggers are run may therefore be important. Accordingly, the syntax for declaring triggers and the mechanisms that cause them to be run may be modified to support the ordering of triggers. For example, a database system may support, in a DDL statement that defines or modifies a trigger, a declaration that a given trigger "FOLLOWS" one or more specifically-named other triggers. When this syntax is used to specify a required ordering relationship, the trigger specifying the "FOLLOWS" relationship will always be run after any other trigger it specifies itself to follow whenever both are run as part of the same phase of the same SQL statement execution.

According to an embodiment, when processing existing data in order to apply the changes for a specific bug fix or feature addition, it is not necessary to run triggers that relate to data changes that have already been properly initialized. A database system may thus implement an interface to allow an operation to specify that a given SQL DML statement should run, as part of its execution, only a chosen upgrade-related trigger and those triggers that have explicit "FOLLOWS" relationships starting with that chosen trigger. The optional argument may be used to choose the trigger to run.

According to an embodiment, when an SQL DML statement is run from within the body of an upgrade-related trigger, only those data changes related to bug fixes or feature additions staged later in the upgrade process need be made on top of the change made by said upgrade-related trigger. Because of this, when a SQL DML statement is issued from within the body of an upgrade-related trigger, the database system may run as part of the DML statement's execution, only those triggers associated with the targeted object that have explicit "FOLLOWS" relationships starting with the trigger issuing the DML statement.

According to an embodiment, an upgrade directly initializes transformed data through an SQL DML statement instead of relying upon a trigger to transform the data. In such an embodiment, the database system should execute only the exact same set of triggers from the statement's target table that it would execute if the trigger was making the data change. Thus, a database system may implement an interface to permit running a SQL DML statement that indicates that the database system should not run the named trigger, but should still run those triggers that have explicit "FOLLOWS" relationships with the named trigger.

According to an embodiment, reverse triggers may also define an ordering relationship. For example, ordering amongst reverse triggers may be identified with the syntax "PRECEDES." By defining a "PRECEDES" relationship, each reverse trigger may declare that it needs to run prior to the running of one or more other specified reverse triggers. This permits each bug fix or feature addition to specify the proper ordering of its triggers relative to those of bug fixes and feature additions that have already been coded, rather than needing to reference triggers that will be written as part of some bug fix or feature addition that will be coded later. The "PRECEDES" relationships may be used in many of the same situations as the "FOLLOWS" relationship.

Interacting with Non-Upgrade Related Triggers

According to an embodiment, triggers that are a normal part of the application (i.e. are not related to the upgrade) run before cross-edition triggers for each phase of the SQL DML statement's execution. Alternatively, they may run after the cross-edition triggers during the after row and after statement phases.

According to an embodiment, when an upgrade directly issues an SQL DML statement, or when an upgrade-related trigger issues an SQL DML statement, the database system may be designed so as to avoid running triggers unrelated to the upgrade as part of the SQL DML statement. For example, a database system may implement rules that implicitly disable the running of non-upgrade-related triggers as part of the DML statements run during the upgrade.

5.7. Variations on Cross-Edition Triggers

According to an embodiment, forward triggers and reverse triggers may also be combined into one program unit, associated with both the pre-upgrade and post-upgrade columns. For example, triggers 580 and 581 could be merged into a combined trigger based on a single unit of stored procedure code. The combined trigger would comprise both the forward and reverse transformation.

According to an embodiment, the code underlying such a combined trigger may be sensitive to the direction of the data transformation that is needed for the conceptually associated edition. For example, the code may test whether the trigger is running as part of the upgrade itself, as part of normal use of the pre-upgrade version of the application, or as part of normal use of the post-upgrade version of the application. The code may then run code appropriate for the context under which the trigger is executing.

Although a database system might recognize the combined program unit as only one trigger, the combined program unit would still be conceptually equivalent to maintaining two separate triggers for the purposes of this disclosure.

5.8. Dealing with Triggers in more than Two Editions

As explained in section 4.0, "Cross-Edition Triggers," according to an embodiment, forward triggers and reverse triggers may be marked with special syntax, such as "FORWARD CROSS-EDITION." Syntax may also be used indicating an edition with which triggers are associated. Such markings may, among other aspects, help facilitate triggers between more than two editions.

The database system may comprise a mechanism, such as that described above, by which it may detect which triggers have been installed in which edition. As part of the process of determining which triggers should be executed in response to data changes, a database system may select amongst the enabled triggers so that it executes only those triggers necessary for the edition associated with the current operation. During execution of an operation that results in trigger execution, the database system may select for execution only those triggers marked as forward triggers associated with editions chronologically later than the operation's associated edition. Conversely, the database system may select for execution only those triggers marked as reverse triggers associated with the operations' associated edition or chronologically earlier editions.

When running triggers associated with different editions, ordering matters. The database system may run forward triggers associated with the immediately later edition first. It may then run forward triggers associated with each subsequent edition in chronological order by edition. Likewise, the database system may run reverse triggers associated with the current edition first. It may then run reverse triggers associated with each predecessor edition in reverse chronological order by edition. Within each set of triggers, the ordering of the triggers may be kept consistent with the declared "FOLLOWS" and "PRECEDES" relationships, as discussed in section 5.6, "Dealing with Multiple Triggers." This ordering of trigger execution occurs separately for each phase of a SQL DML statement's execution at which triggers may run (i.e. before the statement, before each row, after each row, and after each statement).

5.9. Columns with Initialization Expressions

According to an embodiment, a database system may better facilitate upgrades by providing an interface for specifying an initialization expression when adding a new column to a database table. The database system may evaluate the initialization expression to provide a value for that column whenever a row of the table is read, if no value has yet been written into that column in that row. Thus, an upgrade may avoid having to issue statements to initialize post-upgrade data to transformed values, since the initialization expression will cause the transformed value to materialize when needed.

According to an embodiment, forward triggers may help facilitate initialization expressions. Alternatively, the database system may use metadata associated with the new column to define initialization expressions.

In such initialization expressions, data changes in which the post-upgrade data will reside in a new column of the same table as the related pre-upgrade data can be expressed using straightforward SQL expressions referencing only the pre-upgrade data columns of the same row as inputs. Some data changes may then require an upgrade to issue statements that change the data in only a few rows, while the initialization expressions are used to indicate that the post-upgrade data in other rows may be calculated directly from the pre-upgrade data.

According to an embodiment, a value determined by an initialization expression is not necessarily written into the database; rather, it may be supplied only to the operation that required access to the value. If a future operation requires access to the value and the value has still not been set, the database system may execute the initialization expression again to provide the future operation with the appropriate value. Thus, if the initialization expression is a function of a value that has changed since the initial execution of the initialization expression, the change will be captured by the future execution of the initialization expression.

5.10. "Phasing-Out" the Old Edition

According to an embodiment, an upgrade may "phase-out" pre-upgrade components once the upgrade confirms that component and the components relied upon by the component have been properly updated. The upgrade may phase-out clients by directing users to post-upgrade versions of the client as opposed to pre-upgrade versions. Because of the editioning mechanism, the upgrade may phase-out out other components by properly specifying an edition association for post-upgrade clients, and by assuring that all objects in the database that reference the component to be phased-out have been fully updated. After the application has stopped using a particular pre-upgrade component, that component, as well as any cross-edition triggers associated with that component, may be deleted from the database application.

According to an embodiment, the database may store metadata associating object editions and versions with a particular edition. Once the entire edition is ready to be deleted, the upgrade may instruct the database system to delete the edition. The database system may use the metadata to determine all object editions, object versions, and triggers associated with the edition, as well as all metadata associated with the edition. It may then delete them. Alternatively, the upgrade may be configured to delete some or all of these components manually.

5.11. Example Process Flow for Upgrading with Editions

Figure 7:
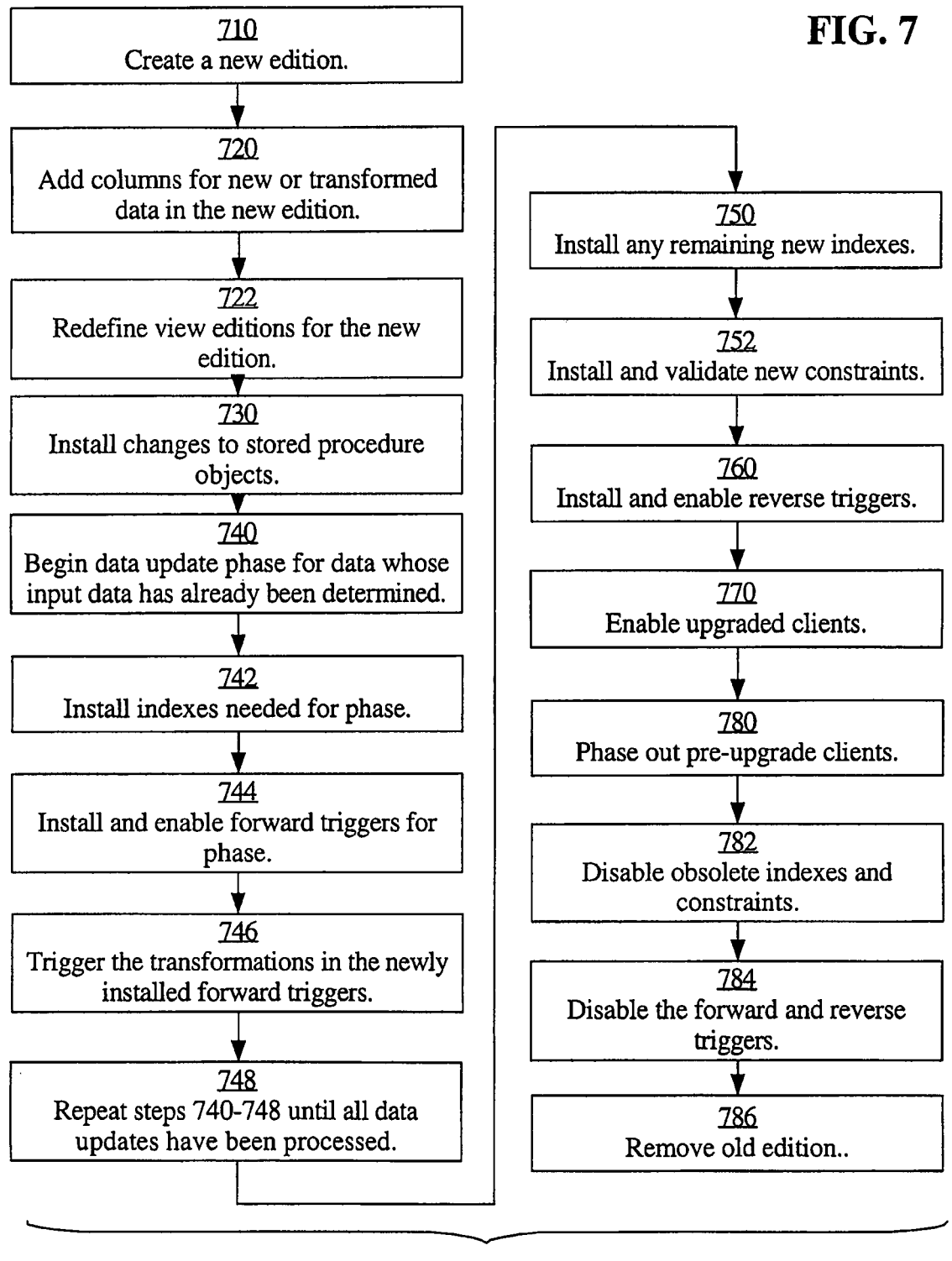
FIG. 7 depicts a sample process flow for upgrading a database application using object editioning, data editioning, and cross-edition triggers.

FIG. 7 depicts a sample process flow for upgrading a database application using object editioning, data editioning, and cross-edition triggers. One skilled in the art will recognize that these steps are merely exemplary—they may be performed in different orders. Some steps may be deleted, and other steps may be added.

In step 710, the upgrade creates a new edition in a database, such as edition 121 in database 115 of FIG. 1 or edition 321 in database 515 of FIG. 5.

In step 720, the upgrade adds new columns in the database for data that will be new or transformed in the new edition. For example, the upgrade may have added columns C4' and C5' in table 370 of FIG. 5. The upgrade may also add new tables to store new or transformed data, as discussed with transformations that add new rows in section 5.4, "Transformations."

In step 722, the upgrade redefines view editions for the new edition (and defines new view editions as needed), so that the view editions only reference the columns and tables appropriate for use by the post-upgrade version of the application. For example, the upgrade may have redefined view edition 330 of FIG. 5 as view edition 331, with column C2 remapped to column C5' of table 370, column C4 added to the view, and column C3 dropped from the view (since, in the depicted embodiment, it is not used in the upgraded application).

In step 730, the upgrade installs changes to stored procedure objects in the new edition.

In step 740, the upgrade begins processing data changes for all data to be transformed for which the necessary input data exists. Since some post-upgrade data may use other post-upgrade data as input, not all post-upgrade data may be immediately transformed.

In step 742, the system installs any indexes needed for the current phase of data changes. These may include indexes on data being queried as part of the data changes. These may also include new unique indexes on any replacement tables or auxiliary tables, added to create a sense of logical identity.

In step 744, the upgrade continues to process data changes by installing and enabling forward triggers. These forward triggers are associated with objects containing input data (e.g. the pre-upgrade data). For example, the upgrade may install trigger 580 associated with column C2'.

In step 746, the upgrade process "triggers" the forward transformations in the forward triggers. For example, the upgrade may issue an UPDATE statement on column C2', as explained in section 4.1, thereby initializing the data values of C5' with data transformed from C2'.

In step 748, steps 740-748 are repeated until the post-upgrade data has been fully generated.

In step 750, the upgrade installs any remaining new indexes.

In step 752, the upgrade installs and validates any new constraints.

In step 760, the upgrade installs and enables reverse triggers. These reverse triggers are associated with objects containing the output data of step 744 (i.e. the post-upgrade data), and apply reverse transformations of post-upgrade data to the pre-upgrade data. For example, the upgrade may install trigger 581 associated with column C5'.

In step 770, the upgrade may enable upgraded clients. Because of the editioning mechanisms, upgraded clients do not have to be deployed all at once. As disclosed throughout this application, upgraded clients may be used concurrently with pre-upgraded clients. Furthermore, because of the cross-edition triggers, both post-upgrade and pre-upgrade clients may access and manipulate data with the assurance that changes will be immediately visible to all other clients in the application.

In step 780, the upgrade may "phase-out" use of pre-upgrade clients.

In step 782, the upgrade may disable constraints and indexes present in the pre-upgrade version of the application that are not intended to remain present in the post-upgrade version of the application.

In step 784, the upgrade may disable the upgrade's cross-edition triggers and any indexes introduced only for the sake of the upgrade process.

Finally, in step 786, the upgrade may at its convenience remove the old edition that had held the pre-upgrade version of the application's stored procedures and view editions.

According to an embodiment, a low-downtime upgrade may be achieved by terminating use of the pre-upgrade version of the application after step 752. Steps 760-780 may be skipped. The database application may be taken down, and steps 780-784 may be performed. The database application may then be put back online as step 770 is performed all at once. Step 786 may be performed when convenient.

5.12. Upgrading Databases Separately from Database Applications

Although the techniques described herein are typically described in terms of a database application that comprises clients separate from the database system, they may also be used for upgrading a database system by itself. For example, a database system may provide predefined objects and data, such as units of stored procedure code that perform a variety of common data manipulation tasks. With little or no modification, the techniques described herein would apply to upgrading these predefined objects and data (or adding and removing predefined objects and data). Likewise, the techniques described are applicable to database applications structured differently than those depicted above. For example, application code may run on the database system itself.

5.13. Database Backups during the Upgrade Process

Typically, an upgrade process will require making a backup of a database before proceeding with the upgrade. The backup allows an upgrade to "roll-back" changes in the event of problems during or as a result of the upgrade. However, according to an embodiment of the present invention, an upgrade may roll-back changes without having to make a backup of the database. Since none of the pre-existing data and objects in a database are modified during the upgrade, the upgrade does not need to backup the database before beginning the upgrade process.

For example, the data in table 370 pointed to by pre-upgrade edition 120 of FIG. 3 is not changed as a result of the upgrade. Rather, new columns of data are added to the database to be used by the post-upgrade edition 121. If problems arise during the upgrade, the upgrade can be "rolled back" simply by pointing users to pre-upgrade components (e.g. edition 120 and client 140) and "dropping" the upgraded edition and components (e.g. edition 121 and client 141).

Not having to create a backup of data saves time and memory. Furthermore, not having to restore a backup if the upgrade goes wrong saves the database application from additional downtime during the "roll-back" process.

6.0. Implementation Mechanism—Hardware Overview

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 802, such as a random access memory (RAM) or other dynamic storage device, coupled to bus 802 for storing information and instructions to be executed by processor 804. Main memory 802 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 812, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one implementation of the invention, those techniques are performed by computer system 800 in response to processor 804 executing one or more sequences of one or more instructions contained in main memory 802. Such instructions may be read into main memory 802 from another machine-readable medium, such as storage device 810. Execution of the sequences of instructions contained in main memory 802 causes processor 804 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 802. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 802, from which processor 804 retrieves and executes the instructions. The instructions received by main memory 802 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 822. ISP 822 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 822, local network 822 and communication interface 818.

The received code may be executed by processor 804 as it is received, and/or stored in storage device 810, or other non-volatile storage for later execution. In this manner, computer system 800 may obtain application code in the form of a carrier wave.

7.0. Extensions and Alternatives

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

concurrently maintaining metadata defining an old edition of one or more objects within a database and metadata defining a new edition of the same one or more objects within the database;

concurrently maintaining as a view, referenced by a particular view label, an old view edition of the view, associated by said metadata with the old edition, and a new view edition of the view, associated by said metadata with the new edition;

wherein the old view edition defines a view column, referenced by a view column label, to be mapped to a first column in a table in the database;

wherein the new view edition defines the same view column, referenced by the same view column label, to be mapped to a second column that is different than the first column and that is in the table in the database; and wherein the second column comprises data values that have been calculated based on corresponding data values in the first column;

executing a first query that references the view by the particular view label and that references the view column by the view column label, wherein executing the first query includes:

in response to determining that the first query is associated with the new edition:

accessing the view column through the new view edition, thereby accessing data in the second column in the table; and performing the first query by at least accessing the view column through the second column; and concurrently to executing the first query, executing a second query that references the view by the particular view label and that references the view column by the view column label, wherein executing the second query includes:

in response to determining that the second query is associated with the old edition: accessing the view column through the old view edition, thereby accessing data in the first column in the table; and performing the second query by at least accessing the view column through the first column; and wherein the method is performed by one or more computing devices.

2. The method of claim 1, wherein accessing the first column causes a change in the first column, and the method further comprises the step of: responsive to the change, automatically transforming the second column to reflect the change in the first column;

wherein accessing the second column causes a change in the second column, and the method further comprises the step of: responsive to the change, transforming the first column to reflect the change in the second column.

3. The method of claim 2, wherein the step of transforming the second column is performed in response to a pre-defined trigger associated with the first column, wherein the pre-defined trigger defines a transformation of data values in the first column to data values in the second column.

4. The method of claim 1, wherein determining that the first query is associated with the new edition is based upon at least one of: an identity of a client requesting performance of the first query, configuration parameters communicated by said client, or session data associated with said client.

5. The method of claim 1, wherein the first column and the second column are stored within a particular table, wherein the view is of the particular table.

6. The method of claim 1, wherein accessing the first column causes a change in the first column, and the method further comprises the step of: responsive to the change, executing at least a set of triggers associated with the first column, each trigger in the set of triggers modifying a different column, including the second column, to reflect the change in the first column;

wherein the different column is mapped to the view column in a different edition.

7. The method of claim 1, wherein accessing the first column causes a change in the first column, and the method further comprises the step of: responsive to the change, executing a plurality of triggers;

wherein executing the plurality of triggers comprises executing the plurality of triggers in an order indicated by ordering data defined for the plurality of triggers.

8. The method of claim 1, wherein the data values in the first column are of a different type than the data values in the second column.

9. The method of claim 1, wherein executing the first query includes initializing a value in the first column based on a function of a corresponding value in the second column.

10. The method of claim 1, wherein executing the first query further includes locking a value in the second column while changing a corresponding value in the first column, said locking continuing at least until the value in the second column has been modified to reflect said changing of the corresponding value.

11. One or more non-transitory computer-readable storage media storing instructions that, when executed by one or more computing devices, cause:

concurrently maintaining metadata defining an old edition of one or more objects within a database and metadata defining a new edition of the same one or more objects within the database;

concurrently maintaining as a view, referenced by a particular view label, an old view edition of the view, associated by said metadata with the old edition, and a new view edition of the view, associated by said metadata with the new edition;

wherein the old view edition defines a view column, referenced by a view column label, to be mapped to a first column in a table in the database;

wherein the new view edition defines the same view column, referenced by the same view column label, to be mapped to a second column that is different than the first column and that is in the table in the database; and wherein the second column comprises data values that have been calculated based on corresponding data values in the first column;

executing a first query that references the view by the particular view label and that references the view column by the view column label, wherein executing the first query includes:

in response to determining that the first query is associated with the new edition:

accessing the view column through the new view edition, thereby accessing data in the second column in the table; and performing the first query by at least accessing the view column through the second column; and concurrently to executing the first query, executing a second query that references the view by the particular view label and that references the view column by the view column label, wherein executing the second query includes:

in response to determining that the second query is associated with the old edition: accessing the view column through the old view edition, thereby accessing data in the first column in the table; and performing the second query by at least accessing the view column through the first column.

12. The one or more non-transitory computer-readable storage media of claim 11, wherein accessing the first column causes a change in the first column, and wherein the instructions, when executed by the one or more computing devices, further cause: responsive to the change, automatically transforming the second column to reflect the change in the first column;

wherein accessing the second column causes a change in the second column, and wherein the instructions, when executed by the one or more computing devices, further cause: responsive to the change, transforming the first column to reflect the change in the second column.

13. The one or more non-transitory computer-readable storage media of claim 12, wherein the step of transforming the second column is performed in response to a pre-defined trigger associated with the first column, wherein the pre-defined trigger defines a transformation of data values in the first column to data values in the second column.

14. The one or more non-transitory computer-readable storage media of claim 11, wherein determining that the first query is associated with the new edition is based upon at least one of: an identity of a client requesting performance of the first query, configuration parameters communicated by said client, or session data associated with said client.

15. The one or more non-transitory computer-readable storage media of claim 11, wherein the first column and the second column are stored within a particular table, wherein the view is of the particular table.

16. The one or more non-transitory computer-readable storage media of claim 11,
    wherein accessing the first column causes a change in the first column, and the instructions, when executed by the one or more computing devices, further cause: responsive to the change, executing at least a set of triggers associated with the first column, each trigger in the set of triggers modifying a different column, including the second column, to reflect the change in the first column;
    wherein the different column is mapped to the view column in a different edition.

17. The one or more non-transitory computer-readable storage media of claim 11,
    wherein accessing the first column causes a change in the first column, and the instructions, when executed by the one or more computing devices, further cause: responsive to the change, executing a plurality of triggers;
    wherein executing the plurality of triggers comprises executing the plurality of triggers in an order indicated by ordering data defined for the plurality of triggers.

18. The one or more non-transitory computer-readable storage media of claim 11, wherein the data values in the first column are of a different type than the data values in the second column.

19. The one or more non-transitory computer-readable storage media of claim 11, wherein executing the first query includes initializing a value in the first column based on a function of a corresponding value in the second column.

20. The one or more non-transitory computer-readable storage media of claim 11, wherein executing the first query further includes locking a value in the second column while changing a corresponding value in the first column, said locking continuing at least until the value in the second column has been modified to reflect said changing of the corresponding value.

21. The method of claim 1, wherein maintaining metadata defining the old edition of one or more objects within the database and metadata defining the new edition of the same one or more objects within the database comprises maintaining additional metadata that defines at least one additional new edition, and associates the new view edition with the at least one additional new edition and the new edition.

22. The one or more non-transitory computer-readable storage media of claim 11, wherein maintaining metadata defining the old edition of one or more objects within the database and the new edition of the same one or more objects within the database comprises maintaining additional metadata that defines at least one additional new edition, and associates the new view edition with the at least one additional new edition and the new edition.

* * * * *

UNITED STATES PATENT AND TRADEMARK OFFICE
CERTIFICATE OF CORRECTION

PATENT NO. : 8,521,706 B2
APPLICATION NO. : 11/875478
DATED : August 27, 2013
INVENTOR(S) : Alpern et al.

It is certified that error appears in the above-identified patent and that said Letters Patent is hereby corrected as shown below:

On the title page, column 2, item (56), under other publications, line 4, delete "O3" and insert -- 03 --, therefor.

On title page 2, column 2, item (56), under other publications, line 21, delete "http://blgs.msdn.com/squlcat/archive/" and insert -- http://blogs.msdn.com/sqlcat/archive/ --, therefor.

In the Specification:

In column 1, line 9, delete "Alpem et al.," and insert -- Alpern et al., --, therefor.

In column 18, line 15, delete "system" and insert -- system. --, therefor.

In column 18, line 20, delete "chose" and insert -- choose --, therefor.

In the Claims:

In column 31, line 1-2, in Claim 1, above "concurrently" delete "performing the first query by at least accessing the view column through the second column; and".

In column 32, line 36-37, in Claim 11, above "concurrently" delete "performing the first query by at least accessing the view column through the second column; and".

Signed and Sealed this
Seventeenth Day of December, 2013

Margaret A. Focarino
*Commissioner for Patents of the United States Patent and Trademark Office*